US012775461B2

(12) United States Patent
Baker

(10) Patent No.: US 12,775,461 B2
(45) Date of Patent: Oct. 27, 2026

(54) SOURCE CODE HISTORY GENERATION

(71) Applicant: Microsoft Technology Licensing, LLC, Redmond, WA (US)

(72) Inventor: William Tigard Baker, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 255 days.

(21) Appl. No.: 18/589,850

(22) Filed: Feb. 28, 2024

(65) Prior Publication Data

US 2025/0272091 A1 Aug. 28, 2025

(51) Int. Cl.

| | |
|---|---|
| ***G06F 8/73*** | (2018.01) |
| ***G06F 8/65*** | (2018.01) |
| ***G06F 8/71*** | (2018.01) |
| ***G06F 8/77*** | (2018.01) |
| ***G06F 16/3329*** | (2025.01) |
| ***G06F 16/334*** | (2025.01) |

(Continued)

(52) U.S. Cl.

CPC .................. *G06F 8/73* (2013.01); *G06F 8/65* (2013.01); *G06F 8/71* (2013.01); *G06F 8/77* (2013.01); *G06F 16/3329* (2019.01); *G06F 16/3344* (2019.01); *G06F 40/20* (2020.01); *G06F 40/30* (2020.01); *G06F 40/40* (2020.01); *G06N 3/08* (2013.01); *G06N 20/00* (2019.01)

(58) Field of Classification Search

CPC .......... G06F 8/60–66; G06F 8/71; G06F 8/73; G06F 8/77; G06F 40/20; G06F 40/30; G06F 40/40; G06F 16/3329; G06F 16/3344; G06N 20/00; G06N 3/08

USPC .................................................. 717/168–178

See application file for complete search history.

(56) References Cited

U.S. PATENT DOCUMENTS 12,487,875 B1 * 12/2025 Côrte-Real ......... G06F 11/0769
2024/0004638 A1 * 1/2024 Zhou .................... G06N 3/0455

FOREIGN PATENT DOCUMENTS

WO WO-2025072919 A1 * 4/2025 ........... G06N 3/0475

OTHER PUBLICATIONS

Al Safwan, Khadijah, Toward Better Understanding and Documentation of Rationale for Code Changes, PhD Dissertation, Virginia Tech, Jun. 28, 2023, 128 pages, [retrieved on Jan. 2, 2026], Retrieved from the Internet: <URL:https://vtechworks.lib.vt.edu/items/318a6a91-482c-4523-9239-add9259df6d3>.*

(Continued)

*Primary Examiner* — Geoffrey R St Leger

(57) ABSTRACT

A system and method for automatically generating a change history of source code using a generative artificial intelligence ("AI") system. In examples, a generative AI system receives a request inquiring about one or more changes made to software code of a software service or application. In response to receiving the request, the generative AI system navigates one or more information sources to collect code change context relevant to history of the code change(s). The generative AI system generates an instruction corresponding to the received request, where the instruction and the code change context are provided as input to a language model (LM) (e.g., a generative AI model). Based on the inquiry of the request, the LM processes the input, generates, and provides a corresponding output. The generative AI system then uses the output to generate and provide an explanation about the code change(s) to a requestor of the request.

20 Claims, 10 Drawing Sheets

(51) Int. Cl.

| | |
|---|---|
| ***G06F 40/20*** | (2020.01) |
| ***G06F 40/30*** | (2020.01) |
| ***G06F 40/40*** | (2020.01) |
| ***G06N 3/08*** | (2023.01) |
| ***G06N 20/00*** | (2019.01) |

(56) References Cited

OTHER PUBLICATIONS

Wang, Song, et al., Large-scale intent analysis for identifying large-review-effort code changes, Information and Software Technology, vol. 130, Feb. 2021, 15 pages, [retrieved on Jan. 2, 2026], Retrieved from the Internet: <URL:https://www.sciencedirect.com/science/article/pii/S0950584920300033?via%3Dihub>.*

* cited by examiner

SOURCE CODE HISTORY GENERATION

BACKGROUND

Source code of a software service or application changes over time due to additions of new features, refactoring of function or methods, bug fixes, performance improvements, security updates, regulatory compliance, and/or other reasons. Understanding the change history of source code provides insights into a range of information that can help a software developer make more informed decisions about new features and code changes. For instance, understanding the history of source code can help to understand the history of a software project, why the source code works the way it does, how another developer implemented a particular feature, why a particular code change was made (e.g., to investigate a bug, outage, or opportunity to improve performance), etc. The change history of source code is typically distributed across various sources of information (information sources), such as in inline comments in the source code, commit messages in a source code repository, pull request descriptions and comments, design documents, etc. Historically, investigating code history requires software developers to navigate a combination of the sources of information to find relevant code change information. This investigation process requires examining a variety of content in the sources of information and extracting relevant pieces of information to provide an understanding of the desired change history. Such examination may be difficult for users with less software development experience and/or skill and may not be scalable. For instance, as the volume of information sources and the volume of content within the information sources increases, it may become exponentially more difficult for users to examine the information source. As such, the investigation process often requires advanced software development knowledge, is not scalable, and is often labor-intensive, time-consuming, and prone to human error.

It is with respect to these and other general considerations that the aspects disclosed herein have been made. Also, although relatively specific problems may be described, it should be understood that the examples should not be limited to solving the specific problems identified in the background or elsewhere in this disclosure.

SUMMARY

Examples of the present disclosure describe systems and methods for automatically generating a change history of source code using a generative artificial intelligence ("AI") system. In examples, a generative AI system receives a request inquiring about one or more changes made to software code of a software service or application. In response to receiving the request, the generative AI system executes a search of one or more information sources to collect code change context relevant to the history of the code change(s). In some examples, executing the search includes navigating a web of information that branches from each commit relevant to the code change(s). The generative AI system generates an instruction to a language model corresponding to the received request, where the instruction and the code change context are provided as input to the language model. In examples, the language model is a generative AI model. Based on the request, the language model processes the input, and generates and provides a corresponding natural language output. The generative AI system then uses the natural language output to generate and provide an explanation about the one or more code changes to a requestor of the request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following figures.

DETAILED DESCRIPTION

Figure 1:
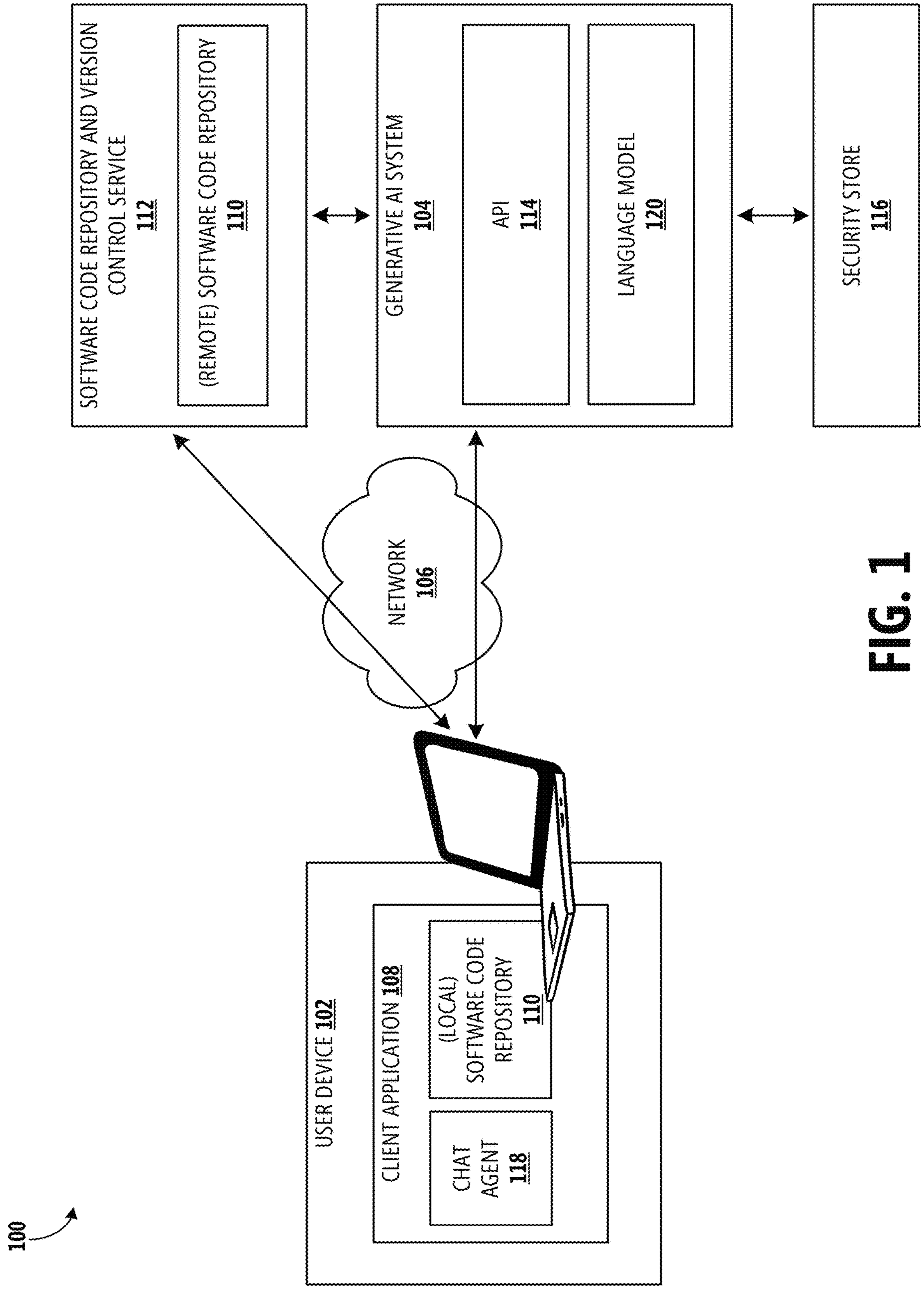
FIG. 1 illustrates an example system for automatically generating an explanation of code change history using a generative AI system.

Historically, software development solutions have required users, such as software developers and administrators, to navigate a combination of information sources to investigate a change made to a portion of software code of a software code file. In examples, an information source is a medium in which information that provides context about a software code change is recorded. In instances in which the user is unfamiliar with the software code file or the portion of the software code (e.g., the user did not write the code, the user wrote the code long ago, or the code has been modified by others), the user may spend a significant amount of time determining why a change was made. Reading through the content of the various information sources and pulling out relevant bits of information requires a significant amount of time and labor.

The present disclosure provides a solution to the above-described deficiencies of previous software development solutions. Embodiments of the present disclosure describe systems and methods for automatically generating a change history of source code using a generative AI system. In examples, a generative AI system implementing a language model receives a user request to provide an explanation about a code change made to software code of a software service or application. In some examples, the language model is a large language model ("LLM"). An LLM refers to a machine learning model that is trained and fine-tuned on a large corpus of media (e.g., text, audio, video, or software code), and that can be accessed and used through an application programming interface (API) or a platform. An LLM performs a variety of tasks, including generating and classifying media, answering user requests and questions in a conversational manner, and translating text from one language to another.

In a first example, the user request is for the generative AI system to explain to a user, in natural language (e.g., conversational language), a history of a portion of the software code. The generative AI system collects code change context for the portion of software code from one or more information sources. Code change context refers to a set of data relating to a change made to the software code. The set of data may include information that can be used to provide history of the portion of software code. Example code change context includes comments in a current version and in previous versions of the software code file, commit messages and/or commit details of commits made to the software code file and/or repository, pull request descriptions and/or pull request comments of pull requests, details of associated issues, details of associated work items, design document content, identified user incidents, collaborative webpage content, etc.

The generative AI system generates a query (e.g., a prompt, instructions, directions, or other information) to be provided to the language model based on the user request. A query refers to input (e.g., text, speech, or other types of media) that is presented to a language model to indicate an intention of the user request (e.g., for a natural language description/explanation of the change history of the software code portion. Along with the query, the generative AI system provides the code change context corresponding to the portion of software code as input to the language model. In some examples, one or more previous user requests and/or language model responses representing turns of a dialogue between a user and the language model may also be provided as input to the language model. For instance, one or more dialogue entries (e.g., requests and responses) that are within a particular dialogue scope (e.g., relating to the same topic) may be provided to the language model. Providing the previous dialogue requests and responses as input enables the language model to provide current responses that are within the context of an ongoing conversation. The language model processes the received input and outputs an explanation of the change history of the software code portion. In examples, the explanation of the code change describes, in natural language, a summary of the changes made to the portion of software code. The generative AI system then provides the explanation of the software code change to the user in fulfillment of the user request.

FIG. 1 illustrates an example system for automatically generating a change history of source code of a software application or service using a generative AI system. System 100, as presented, is a combination of interdependent components that interact to form an integrated whole. Components of system 100 may be hardware components or software components (e.g., Application Programming Interfaces (APIs), modules, runtime libraries) implemented on and/or executed by hardware components of system 100. In one example, components of system 100 are implemented on a single computing device. In another example, components of system 100 are distributed across multiple computing devices and/or computing systems. In FIG. 1, system 100 includes a user device 102, a generative AI system 104, network 106, a client application 108 (e.g., an integrated development environment (IDE) application, a dedicated client, a thin application, or a web browser application), a software code repository 110, a software code repository and version control service 112, and a security store 116. Although system 100 is depicted as comprising a particular combination of computing devices and components, the scale and structure of devices and components described herein may vary and may include additional or fewer components than those described in FIG. 1.

Security store 116 is a storage location that comprises or otherwise has access to access information, such as encryption keys, digital certificates, and other secrets (e.g., passwords and privileged account credentials). In examples, the access information is used to access protected resources (e.g., documents, applications, services, containers, or systems). For instance, security store 116 may store access information for accessing generative AI system 104 and/or software code repository 110. In some examples, security store 116 communicates with a security layer (not pictured) of system 100 to ensure that a user of user device 102 is authorized to access protected resources implicated by a user request provided by the user. For instance, a security layer implemented by user device 102 (or by any other component of system 100) may interrogate security store 116 to determine whether a user is authorized to access a particular software code file stored in software code repository 110. If the security layer determines that security store 116 does not include or have access to requisite access information for accessing a protected resource, the security layer may prevent access to the protected resource.

User device 102 detects and/or collects input data from users and user devices via one or more sensor components (sensors) of user device 102. Examples of sensors include microphones, touch-based sensors, geolocation sensors, accelerometers, optical/magnetic sensors, gyroscopes, keyboards, and pointing/selection tools. In some examples, the input data is not input by a user of user device 102. Instead, user device 102 receives or collects the input data from an application, a service, a storage location (e.g., a database or a file repository), or the like accessible to user device 102. The input data includes, for example, text-based input, audio input, touch input, gesture input, image input, user signals, and/or network signals. In some examples, the input data corresponds to user interaction with software applications or services implemented by, or accessible to, user device 102. For instance, user device 102 provides a graphical user interface that enables users to interact with software applications or services, such as client application 108, software code repository and version control service 112, software debugging and analysis applications, software creation and storage services, language model services, search engines, word processing applications, database services, and the like. In other examples, the input data corresponds to automated interaction with the software applications or services, such as the automatic (e.g., non-manual) execution of scripts or sets of commands at scheduled times or in response to predetermined events. In either scenario, the interaction (e.g., user or automated) may be related to the performance of user activity corresponding to a task, a project, or a data request. Examples of user device 102 include personal computers (PCs), mobile devices (e.g., smartphones, tablets, laptops, personal digital assistants (PDAs)), and wearable devices (e.g., smart eyewear).

In examples, user device 102 provides received input data to client application 108, where client application 108 provides a user interface for interacting with software code repository and version control service 112 and software code repository 110. In some examples, client application 108 is an IDE application installed and run on user device 102, where the IDE application provides one or more tools (e.g., a source code editor, build automation tools, compiler, interpreter, and/or a debugger) for facilitating software development. In other examples, an IDE application runs on a remote server and is accessed through client application 108 (e.g., a web browser or thin application) operating on user device 102. In examples, client application 108 communicates with software code repository and version control service 112 via network 106. Examples of network 106 include a wide area network (WAN), a local area network (LAN), and a private area network (PAN). Although network 106 is depicted as a single network, it is contemplated that network 106 may represent several networks of similar or varying types.

Software code repository and version control services 112 provides software version control, reporting capabilities, requirements management, project management, software build automation, and/or testing and release management capabilities. Software code repository and version control services 112 is used to manage changes to software code files stored in software code repository 110. Software code repository 110 is a storage location that comprises or otherwise has access to software code files and software development assets, such as documentation, test cases, and software scripts. For instance, software code repository 110 may comprise one or more codebases for various projects and organizations of system 100 or of another computing environment. In some examples, software code repository 110 represents a local repository that resides on user device 102. In other examples, software code repository 110 represents a central repository located on a server and accessed via network 106.

In examples, a change or set of changes made to a software code file is staged in a staging area by the software code repository and version control service 112. When a staged change is committed, the software code repository and version control service 112 saves a snapshot (e.g., commit) of the software code file's currently staged changes (e.g., to local software code repository 110 and then pushed to central software code repository 110). In some examples, the commit represents a version of the software code or software code file that can be revisited or restored later. In other examples, the commit is implemented as modifications between a current commit and a previously recorded commit (e.g., rather than a complete snapshot of the software code or the software code file). In examples, software code repository and version control service 112 records each commit with a unique identifier, a timestamp, the name of the person who made the change, and a natural language message describing the change. In further examples, software code repository and version control service 112 provides collaboration tools for branching and merging functionalities that allow users to create branches to work on portions (e.g., features, functions, methods, a line, a range of lines) of software code independently, then merge changes back into a main codebase. In some implementations, software code repository and version control service 112 provides collaboration tools, such as pull requests, code reviews, issue tracking, and collaborative webpages to facilitate collaboration amongst users. In examples, software code repository and version control service 112 records and provides various pull request information, including descriptions, comments, associated work items, associated collaborative webpages, and/or other metadata.

In some examples, user device 102, client application 108, and/or software code repository and version control service 112 include a chat agent 118. Chat agent 118 provides information or assistance to users through natural language (e.g., human-like text) conversations. A user of user device 102 may interact with chat agent 118 in a conversational or natural-language manner using text, graphics, speech, gestures, etc. For instance, the user may provide an input dialogue to the chat agent 118 via a chat agent interface. In some examples, chat agent 118 is integrated into an operating system of user device 102. In other examples, chat agent 118 is integrated into client application 108 or software code repository and version control service 112. For instance, functionality of chat agent 118 may be embedded in the application/service's codebase, where user interaction with chat agent 118 is performed through a UI provided by client application 108 or software code repository and version control service 112. In other examples, the operating system or client application 108 communicates with an external chat agent 118 (e.g., a chat agent service). For instance, chat agent 118 may be hosted by a cloud platform service that hosts chat agents and makes them available to various channels.

In examples, client application 108 and/or software code repository and version control service 112 further communicates with and provides input data to generative AI system 104 via network 106. It is further contemplated that network 106 may be used by generative AI system 104 to interact with one or more of software code repository and version control service 112 and/or security store 116. In some examples, generative AI system 104 is implemented in a remote cloud-based or server-based environment using one or more computing devices, such as server devices (e.g., web servers, file servers, application servers, database servers), personal computers (PCs), virtual devices, or mobile devices. Generative AI system 104 comprises hardware and/or software components and may be subject to one or more distributed computing models/services (e.g., Infrastructure as a Service (IaaS), Platform as a Service (PaaS), Software as a Service (SaaS), Functions as a Service (FaaS)). In other implementations, generative AI system 104 is implemented in a local (e.g., on-premises) computing environment, such as in a home or in an office. In further implementations, input data is provided to the generative AI system 104 without using network 106. For instance, generative AI system 104 or one or more components thereof may be implemented directly on user device 102.

Generative AI system 104 provides a set of APIs and functionality that improves the traditional software development, debugging, and/or analysis experience for users by providing contextually relevant AI and machine learning (ML)-based insights and actionable functions during software development, debugging, and/or analysis processes. For instance, generative AI system 104 provides functionality enabling users to inquire, among other things, about a change or multiple changes made to software code. The change(s) may be related to an investigation of a bug, an outage, or an opportunity to improve performance, to correct an error, to understand the history of a software project, why the source code works the way it does, how another developer implemented a feature, etc.

In FIG. 1, generative AI system 104 comprises at least one API 114 and language model 120. In other implementations, language model 120 is not included in generative AI system 104 and generative AI system 104 is in communication with language model 120 via one or more APIs. In yet further implementations, a plurality of language models 120 are included, where one language model 120 may be included in generative AI system 104 and another language model 120 may be separate from the generative AI system 104. Although API 114 is depicted as a single API, it is contemplated that API 114 (or the functionality thereof) may be incorporated into or distributed amongst one or more APIs.

An API, as used herein, refers to software that provides a means for two or more computer programs (e.g., applications or services) to communicate with each other. In examples, an API abstracts the underlying implementation of the API by exposing certain objects or actions to a user. In another embodiment, one or more APIs 114 include a processing system and memory comprising computer executable instructions that, when executed, perform various operations to generate a code change explanation response and provide the response to a requestor of a code change explanation request.

In some examples, generative AI system 104 is integrated into a separate application or service, such as client application 108 (e.g., an IDE application) or software code repository and version control service 112. In examples, generative AI system 104 uses API 114 to receive an indication of a user request for a natural language explanation of a change or changes made to a portion of software code (herein referred to as a change of interest). A change of interest refers to a modification made to at least a portion of a software code file, such as adding new code, modifying existing code, or deleting code. The portion of the software code file may include a line or a range of lines, a feature, a function, a method, etc. The indication of the user request may be received via API 114. In some examples, the user request corresponds to user input corresponding to a selection of a document element or a user interface element (e.g., a button, a hyperlink, or a menu option) in a document (e.g., a software code file), an interface of client application 108 or software code repository and version control service 112, an input dialogue to chat agent 118, etc.

In some examples, the indication of the user request is received as a request to the generative AI system 104 for a natural language explanation about a code change made to a portion of a software code file (e.g., a change of interest), herein referred to as a code change explanation request. The code change explanation request triggers the generative AI system 104 to execute a search for relevant code change context, generate a natural language explanation about the change of interest, and provide the natural language explanation to the requestor (e.g., the user). The change of interest may be related to an investigation of a bug, an outage, or an opportunity to improve performance, to correct an error, to understand the history of a software project, why the source code works the way it does, how another developer implemented a feature, etc. In some examples, the user request corresponds to a user selection of a command, an icon, or an option in a context menu linked to a preconfigured explanation request option. Some example preconfigured explanation request options correspond to various requests about the code change, such as "show history," "reason for this change," "reason why this function was added/changed," "summarize," "are there incidents associated with this line/function," etc. Additional and/or alternative explanation request options are contemplated. In some implementations, each preconfigured explanation request option, when selected, causes a particular request to be included in a query (e.g., instructions) provided to language model 120. In other examples, the user request corresponds to an input dialogue received via a chat agent interface, such as "Please tell me the history of line 86," "What was the feature the changes in lines 45-50 were made to support?" "Was there a live site incident associated with this change?" "Was there a customer reported issue related to this change?" or "Please summarize the changes made to this file." In some examples, the input dialogue is included in a code change explanation request received by generative AI system 104, which triggers the generative AI system 104 to include the input dialogue in the query provided to language model 120. In yet other examples, the user request corresponds to another type of user input related to inquiring about a code change of interest.

In some implementations, the code change explanation request includes one or more identifiers (e.g., a software code file identifier, line number identifier, method name, and/or function name) corresponding to the user request. For instance, one or more software code identifiers specify or otherwise indicate the software code file and/or lines, method, function, or other portion of the software code file including the change of interest associated with the user request. In examples, receiving the code change explanation request triggers generative AI system 104 to execute a search of one or more information sources using the one or more identifiers to collect code change context relevant to the history of the code change of interest. In some examples, identification of the one or more information sources is based on the specific IDE application and/or software code repository and version control service 112. For instance, different client applications 108 and/or software code repository and version control services 112 may provide different code navigation tools with which the generative AI system 104 interacts to execute the search. Some example code navigation tools include a software code file viewer interface, commit history log viewer of the software code repository 110 where the software code file is stored, line history viewer, pull request interface, issue explorer, user incident explorer, document management system search interface, and/or collaborative webpage browser interface. In some implementations, using code navigation tools to execute the search allows the generative AI system 104 to identify information sources of relevant code change context. Examples of information sources include a current and previous versions of a software code file, a line-by-line history of changes, commits included in a repository commit history database associated with the code change, pull requests included in a pull request database associated with the commits, issues recorded in an issue database associated with the pull requests, associated work items in a work item database, design documents stored in a document management system related to a project of which the software code file is included, and/or a collaborative webpage related to the software code project (e.g., a webpage including collaborative content).

In an example implementation, executing the search of one or more information sources comprises executing a first search using a first code navigation tool (e.g., the software code file viewer interface) to identify relevant information sources and to collect relevant code change context. In an example, the generative AI system 104 uses the first code navigation tool to search for a current version and one or more previous versions of the software code file. In some examples, executing the first search includes using various search criteria to limit search results (e.g., by recency, by project, or by user). Executing the first search further includes searching for and collecting one or more inline comments associated with the change of interest included in the current and previous versions of the software code file. For instance, inline comments are text annotations added to the code intended for human readers and ignored by the compiler or interpreter when the code is executed.

In another example implementation, executing the search of one or more information sources comprises executing a second search using a second code navigation tool (e.g., a line history viewer) to search for and collect information about a commit that previously modified the specific portion of code specified in the user request. The information about the commit, for instance, includes the commit identifier, a commit message, and details, such as the author and date.

In another example implementation, executing the search of one or more information sources comprises executing a third search using a third code navigation tool (e.g., a repository commit history log viewer) to search for and collect additional information about the commit and/or a related commit, such as commit messages and commit details. In one example, the generative AI system 104 uses the commit identifier collected in the second search to access the changes made to the source code file in the commit. In another example, the generative AI system 104 uses one or a combination of the commit identifier, author, or date collected about the commit in the second search to identify related commits (e.g., made by a same author and/or within a same timeframe).

In another example implementation, executing the search of one or more information sources comprises executing a fourth search using a fourth code navigation tool (e.g., a pull request interface) to search for and access one or more pull requests associated with one or more identified commits. In one example, the generative AI system 104 causes a search of a pull request database for a pull request associated with the commit identifier collected in the second search. In another example, the generative AI system 104 collects information included in the pull request, such as a pull request description, pull request comments, references to associated issues, work items, and/or documentation, a link to a collaborative webpage (e.g., a wiki) associated with the software project, etc.

In another example implementation, executing the search of one or more information sources comprises executing a fifth search using a fifth code navigation tool (e.g., an issue explorer) to search for and collect details about issues in an issue database identified as associated with the change of interest. For instance, issues may include information recorded about issue events.

In another example implementation, executing the search of one or more information sources comprises executing a sixth search using a sixth code navigation tool (e.g., a work item explorer) to search for and collect details about associated work items. In some examples, information about associated user incidents associated with the work items is also collected.

In another example implementation, executing the search of one or more information sources comprises executing a seventh search using a seventh code navigation tool (e.g., a document management system search interface) to search for design documents stored in a document management system and collect content from the design documents.

In another example implementation, executing the search of one or more information sources comprises executing an eighth search using an eighth code navigation tool (e.g., a collaborative webpage browser interface) to access a collaborative webpage (e.g., a wiki) associated with the software project and to collect webpage content included in the collaborative webpage. In some examples, the eighth search further includes accessing and collecting content from design documents or other documentation linked to in the collaborative webpage. In further example implementations, alternative and/or additional searches are executed to collect various code change context.

In an example, generative AI system 104 further generates a query including a statement (e.g., one or more terms) or a request for language model 120 to generate a natural language explanation about the change of interest. In examples, language model 120 is configured to receive input comprising at least a query that includes a statement or a request intended for language model 120. In some examples, language model 120 is configured to receive input to comprise additional information. The additional information expected in the input may be based on the statement or request included in the query. For instance, when the query includes a request to explain why a code change was made to specified software code, language model 120 is configured to receive the input to additionally include code change context for the specified software code, lines of software code corresponding to the specified software code, and/or one or more previous dialogue requests and responses between a user and language model 120. In examples, language model 120 is configured to receive the input and/or each portion of the input (e.g., the query and the code change context) to be formatted in accordance with a particular schema or rule set and/or to be provided in a particular sequence. For example, the input may be limited to a particular number of terms or tokens, an input may be required to include or omit certain terms or tokens, a code change context may be required to include an identifier of the software code file, and/or lines of software code, if included, may have a maximum line limit. Additionally, the input may be expected to be provided such that the query is provided first, the code change context is provided second, and so on.

In examples, generative AI system 104 provides the code change context, the query, and one or more previous dialogue entries (if applicable) as input to language model 120. Language model 120 is a machine learning model that provides output in response to requests from generative AI system 104. In examples, language model 120 is a generative AI model, such as an LLM, a software code generation model, an image generation model, or an audio generation model. A generative AI model refers to a model or algorithm that has a primary function of content generation, in contrast to AI models having other primary functions, such as data classification, data grouping, or action selection. Language model 120 is trained to interpret complex intent and cause and effect, and to interpret and generate sequences of tokens (parts of words), which may be in the form of natural language. Language model 120 is also trained to perform language translation, semantic search classification, complex classification, text sentiment, summarization, summarization for an audience, and/or other natural language functionality.

In some examples, language model 120 is implemented using a neural network, such as a deep neural network, that utilizes a transformer architecture to process received input. In other examples, language model 120 is implemented using an alternative ML model or a neural network that utilizes a different architecture, such as a convolutional neural network, a recurrent neural network, or an autoencoder. The neural network may include an input layer for receiving input, one or more hidden layers for performing computations associated with the input, and an output layer for providing a result for the input. In one example, the hidden layers include attention mechanisms that enable language model 120 to focus on specific portions of the input, and to generate context-aware outputs. Language model 120 may be trained based on supervised learning techniques using a large corpus of annotated and/or unannotated media. The corpus of annotated and/or unannotated media includes various software language formats and object definitions, software code examples in various software language, explanations of steps in software code or intents of the software code, software execution flows, explanations of errors and issues associated with software code, explanations of software code changes, repair procedures, commit procedures and formats, pull request procedures and formats, and/or other data related to generating a change history of software code. In such embodiments, based on the supervised learning techniques, the language model 120 is trained to predict words or tokens (e.g., a next word or token) in a given text sequence.

In examples, the size and/or classification (e.g., language model versus LLM) of language model 120 is determined based on the number of words or tokens in the of the dataset used to train language model 120 or based on the number of parameters included in language model 120. For instance, the number of parameters for a language model (e.g., Bidirectional Encoder Representations from Transformers (BERT), Word2Vec, Global and Vectors (GloVe), Embeddings from Language Models (ELMo), or XLNet) may be in the millions (or less), whereas the number of parameters for an LLM (e.g., Generative Pre-trained Transformer (GPT)-3 or GPT-4, Large Language Model Meta AI (LLaMA) 2, BigScience Large Open-science Open-access Multilingual Language Model (BLOOM)) may be in the billions (or more). The parameters of language model 120 are numerical values representing weights and biases that collectively define the behavior of language model 120. Typically, larger numbers of parameters result in a more complex language model 120 that has a strong understanding of the structure and meaning of data, which enables language model 120 to efficaciously identify intricate patterns in the data.

In some examples, language model 120 receives input from generative AI system 104. For instance, generative AI system 104 may include one or algorithms that perform steps that create the input intended for language model 120. In examples, generative AI system 104 provides the input to language model 120 via a function or interface of API 114. In other examples, language model 120 receives input from one or more other components of generative AI system 104. At least a portion of the output or result of the one or algorithms may be formatted to match an expected format of input for the language model 120. The formatted or unformatted portion of the output or result of the one or algorithms is then provided to language model 120 via a function or interface accessible to the one or algorithms. In at least one example, language model 120 also receives input directly from a user via a command line interface of user device 102 or generative AI system 104.

Upon receiving input, language model 120 processes the input and generates an output representing a response corresponding to the query in the input. For instance, in response to receiving input from generative AI system 104 that is associated with a user request for an explanation of code change of interest, language model 120 outputs a natural language explanation about the change of interest to generative AI system 104. In some implementations, generative AI system 104 processes the output of language model 120 and generates a code change explanation response, which is provided to user device 102 via API 114. The code change explanation response includes a natural language explanation of the code change indicated in the code change explanation request.

In some examples, generative AI system 104 receives an indication of a follow-up user request. In some implementations, generative AI system 104 further provides one or more suggested follow-up request options, which are included in the code change explanation response and provided to the user. In some examples, generative AI system 104 requests the suggested follow-up request options from language model 120. For instance, generative AI system 104 may include a request for the suggested follow-up request options in the query for the natural language explanation of the code change of interest or send a subsequent request/query to language model 120 for the suggested follow-up request options. In examples, the suggested follow-up request options are generated based on the context of the interaction with the user (e.g., user requests and code change explanation responses and/or inputs and outputs to language model 120) and offer relevant options for the user to choose from as a potential next dialogue in the interaction. In further implementations, generative AI system 104 includes, in the code change explanation response, one or more links and/or references to the information sources from which code change context was obtained. The links and/or references may be presented as footnotes, inline links, or as separate objects. For instance, the links and/or references may be selected by the user to access the information sources and explore the code change context if desired. Alternatively, language model 120 may provide the output including a code change explanation directly to user device 102.

Aspects of the present disclosure provide various technical benefits. For instance, the generative AI system 104 is able to analyze a volume of context information from various information sources and condense the information into a digestible chunk (e.g., a natural language explanation) that can be read efficiently by the user. Generative AI system 104 may further improve accuracy of identifying relevant context information. Additionally, using aspects of the present disclosure to research and provide an explanation of the change history is scalable, where generative AI system 104 may analyze and provide an explanation of a plurality of (e.g., large volumes of) changes and/or a change history of a plurality of software code files. Further, generative AI system 104 may enable change history research to be accessible to users with minimal software development experience and/or skill. In some implementations, generative AI system 104 can further be used to identify patterns and trends in code changes made to a software code file, a software project, or across software projects. Identified patterns and trends of code changes may be used to provide automated recommendations and/or warnings to users in future software code development tasks.

Figure 2:
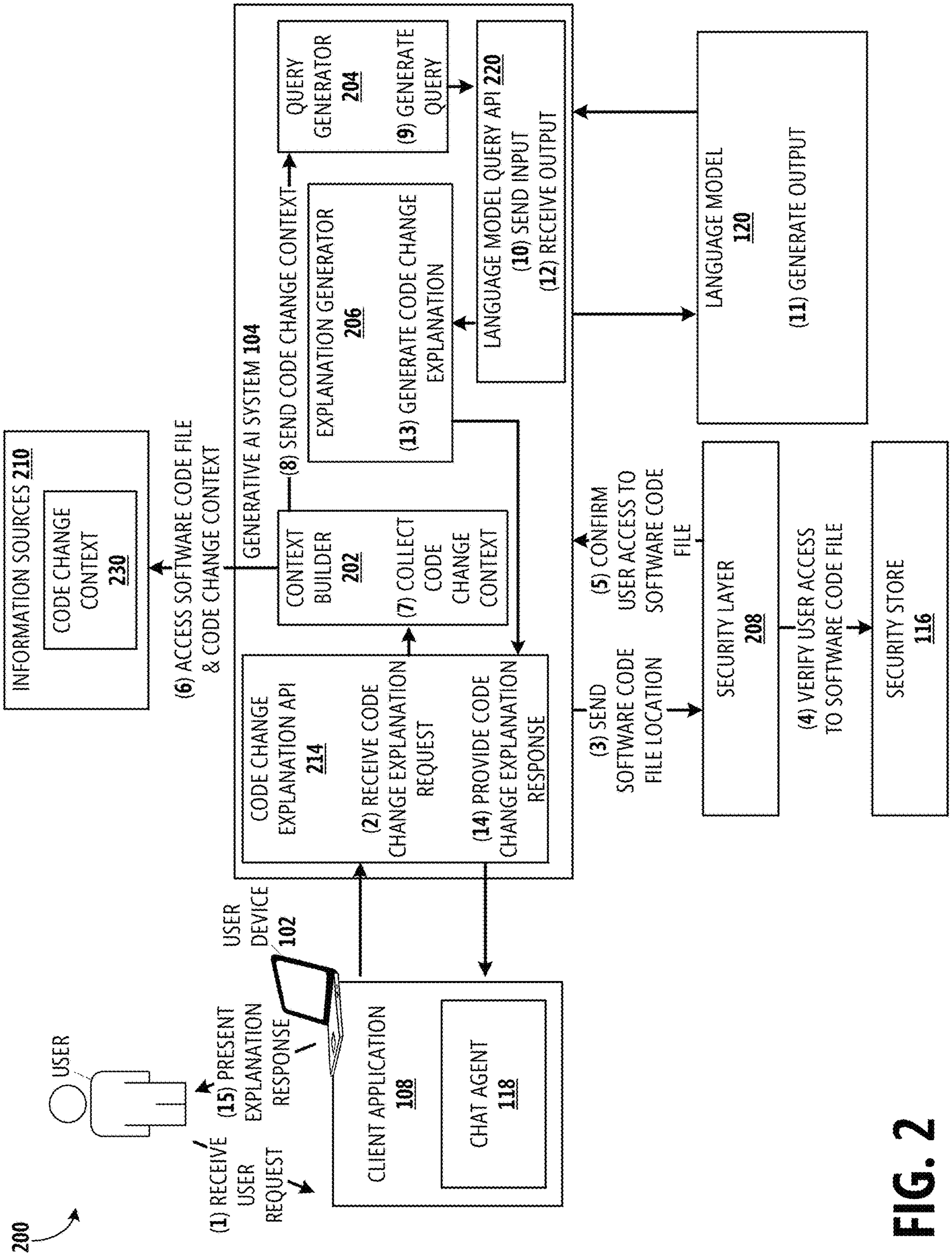
FIG. 2 illustrates an example process flow for processing a user request provided to a generative AI system.

FIG. 2 illustrates an example process flow for processing a user request provided to a generative AI system. In examples, process 200 is executed by an AI system, such as generative AI system 104. In the embodiment described in process 200, generative AI system 104 includes code change explanation API 214, context builder 202, query generator 204, explanation generator 206, and/or language model query API 220. However, in other embodiments, one or a combination of the code change explanation API 214, context builder 202, query generator 204, explanation generator 206, and/or language model query API 220 may be implemented (e.g., as an extension, an add-in, or other functionality) in a separate application, service, or system. In examples, code change explanation API 214 is an interface via which a code change explanation request is received from client application 108 and provided to the generative AI system 104 and via which a corresponding code change explanation response generated by language model 120 is provided to a requestor via the client application 108. In further examples, language model query API 220 is an interface via which generative AI system 104 queries language model 120 and receives corresponding responses from language model 120. In some implementations, each of context builder 202, query generator 204, and explanation generator 206 include a processing system and memory comprising computer executable instructions that, when executed, cause the processing system to perform operations to provide a natural language explanation of changes made to software code. In other implementations, all or a combination of context builder 202, query generator 204, and/or explanation generator 206 operate on a single computing device that includes a processing system and memory including instructions that, when executed, cause the processing system to perform operations of all or a combination of context builder 202, query generator 204, and/or explanation generator 206.

Process flow 200 commences as client application 108 operating on user device 102 receives a user request to explain change history of at least a portion of software. In some examples, code change explanation API 214 may be invoked via a user interface provided by or exposed to user device 102. For instance, code change explanation API 214 may be invoked via user input corresponding to a selection of a document element or a user interface element (e.g., a button, a hyperlink, or a menu option) in a document, an interface of client application 108 or software code repository and version control service 112, a chat agent 118, etc. Alternatively, code change explanation API 214 is invoked via user input provided directly to language model 120 via a command line interface of user device 102. For instance, in response to receiving a user request, language model 120 may invoke code change explanation API 214.

In some embodiments, the user request is provided by a user that is reviewing a software code file comprising a portion of software code to which at least one code change has been made. In one instance, the code change led to a failure of a particular function in the software code file causing or contributing to an application operating or terminating abnormally (or becoming inoperable). In another instance, the user code change is part of a history of the software code file or associated project that the user wants to understand. In another instance, the user may want to understand why the software code works in the way it does, to understand how another developer implemented a feature in the software code, to investigate how to improve performance of an application, etc.

As one example, the user opens the source code file from the software code repository 110 and navigates to, focuses on, and/or selects a portion (e.g., a specific line or range of lines) of the software code file in which a code change has been made. In examples, an option is presented to the user, where the option is corresponds to a specific type of code change explanation request (e.g., request for an explanation of the history of the code change or why the code change was made) that can be made to the generative AI system 104. The option may include, for example, a command (e.g., a shortcut key, a spoken command, a gesture) input by the user, an icon, or a menu or context menu option linked to a specific code change explanation request (e.g., "show history," "reason for this change," "reason why this function was added/changed," "summarize," or "are there incidents associated with this line/function?"). In examples, when an option is selected by the user (e.g., a user request), the corresponding code change explanation request is received by code change explanation API 214. In further examples, various metadata is captured in association with the selected option, such as a software code file identifier that is used to identify a particular file associated with the software code, a software code repository identifier that is used to identify the particular software code repository 110 used to store the software code file, a line number identifier, or a method or function name used to identify the particular portion of software code associated with the user request. In some examples, the software code file identifier, software code repository identifier, line number identifier, method name, and/or function name is provided explicitly by the user as part of the user request. In other examples, the software code file identifier, software code repository identifier, line number identifier, method name, and/or function name are provided by client application 108.

As another example, the user may use chat agent 118 of client application 108 or software code repository and version control service 112 to input a user request for an explanation of a change to an indicated portion (e.g., line, range of lines, function, or method) of the software code. For instance, a code change explanation request is triggered by an input dialogue received in a chat conversation between the user and chat agent 118 via a chat agent interface. Some example input dialogues include, "Please tell me about the change made to method 'X'," or "Is this change related to changes made in other files of this project?"

In examples, the code change explanation request (or an indication thereof) is communicated to generative AI system 104 via code change explanation API 214. The code change explanation request includes the user request (e.g., selected preconfigured explanation request option or chat input) and, in some examples, metadata, such as one or more identifiers (e.g., the software code file identifier, line number identifier, method name, and/or function name) corresponding to the user request. In some implementations, various guidance data is additionally provided with the code change explanation request. Guidance data is configurable and provides guidance to generative AI system 104 as to an expected output. Examples of guidance data include history search limits (e.g., date, types of data interested in and/or not interested in, examples of expected output, output formatting, response length).

In some implementations, generative AI system 104 provides one or more identifiers received from client application 108 to security layer 208. Security layer 208 queries security store 116 to determine whether security store 116 comprises access information that allows the user to access the software code file corresponding to the software code file identifier. If security layer 208 determines that security store 116 does not comprise valid and/or current access information enabling the user to access the software code file, security layer 208 prevents execution of the code change explanation request. However, if security layer 208 determines that security store 116 does comprise valid and/or current access information enabling the user to access the software code file, security layer 208 provides an authorization confirmation ("software code file authorization") to generative AI system 104.

Upon receipt by generative AI system 104 of the software code file authorization from security layer 208, context builder 202 interacts with one or more code navigation tools of client application 108 and/or software code repository and version control service 112 to identify one or more information sources 210 for code change context 230 relevant to history of the code change of interest indicated in the code change explanation request. Some example code navigation tools include a software code file viewer interface, a repository commit history log viewer, a line history viewer, a pull request interface, an issue explorer, a work item explorer, a document management system search interface, and/or a collaborative webpage browser interface. In some implementations, in using a code navigation tool to execute a search, context builder 202 identifies information sources of relevant code change context 230, such as the software code file, a line-by-line history of changes, commits in a repository commit history log, pull requests in a pull request database, associated issues in an issue database, associated work items in a work item database, design documents in a document management system, and/or a collaborative webpage related to the software code file project. Example code change context includes comments in a current version and in previous versions of the software code file, commit messages and/or commit details of commits made to the software code file and/or repository, pull request descriptions and/or pull request comments of pull requests, details of associated issues, details of associated work items, design document content, identified user incidents, collaborative webpage content, etc. In examples, context builder 202 provides collected code change context 230 to query generator 204.

In some implementations, generative AI system 104 further uses context builder 202 to retrieve the software code file. For example, context builder 202 may use the identified storage location of the software code file to retrieve the software code file from software code repository 110 or access the software code file stored in software code repository 110. Context builder 202 identifies lines of software code in the software code file corresponding to the portion of software code. In some examples, context builder 202 also identifies or extracts additional lines of software code surrounding the lines of software code corresponding to the portion of software code. For instance, context builder 202 may extract lines of software code for a class comprising the portion of software code or lines of software code for the entire software code file. Context builder 202 may provide the lines of software code to query generator 204.

Generative AI system 104 uses query generator 204 to generate a query (e.g., instructions, a prompt, directions, or other information) intended to solicit an explanation of the history of changes to the portion of software code based on the user request. In an example implementation, the query is an AI prompt that includes or references the code change explanation request and instructions to language model 120 to generate a response to the code change explanation request. An AI prompt may be considered a generated set of instructions, a request for a specific task, a question, or data input that is provided as input into a generative AI model, such as language model 120. The query can vary in format and encompass textual data, numerical inputs, audio cues, visual images, or any combination thereof, depending on the language model's design and functionality. The query initiates a computational process within language model 120, where language model 120 applies algorithms, such as neural networks, to generate a response or output. The query itself may be considered a single object or closed set of data that is provided to language model 120. In examples, the query may be in the form of a question, a statement, a scenario description, examples, or other text to guide language model 120 to provide a desired response.

As one specific example, query generator 204 may generate the following query: "Provide a natural language explanation of the changes to the software code below based on the code change context provided." As another specific example, query generator 204 may include the user input (e.g., received command(s), preconfigured explanation request option selection, and/or text provided by the user) in the query, such as "Generate a response to the request <USER REQUEST> using the context <CODE CHANGE CONTEXT 230 from context builder 202>." In some examples, query generator 204 generates a query by selecting a candidate query from an existing list of candidate queries. For instance, each candidate query in the list may be mapped to or otherwise associated with a usage scenario (e.g., summarize the changes made to this file or determine any incidents or reported issues related to this change"). In other examples, each candidate query in the list may be linked to a preconfigured explanation request option. A query may be selected from the list of candidate queries based on a match between the determined intent for the explanation request and the usage scenario for the query. If multiple queries in the list are determined to be associated with a usage scenario, query generator 204 may select one of the multiple queries based on predefined criteria, such as the number of characters or lines in the identified lines of software code or previous feedback of the user. For instance, query generator 204 may determine that, in previous code change explanation requests from the user, the user often provides multiple subsequent requests for additional information to supplement the explanations provided by language model 120. As a result, query generator 204 may select the query that is intended to provide the most verbose or in-depth explanation.

In other examples, query generator 204 generates an instruction by dynamically generating a query in response to receiving the code change context 230 and/or the portion of software code from context builder 202. For instance, query generator 204 may analyze the code change explanation request using semantic analysis techniques to identify terms in the code change explanation request and/or an intent for the code change explanation request. In at least one example, the semantic analysis techniques involve the use of ML algorithms to perform a lexical semantic analysis to determine the meaning of each of the terms in the code change explanation request individually, performing word sense disambiguation to determine the context of each term based on the context of the term's occurrence within the code change explanation request, and/or performing relationship extraction to identify entities in the code change explanation request and relationships between the identified entities. Based on the semantic analyses, an intent classification is performed to determine the intent of the code change explanation request using intent and/or sentiment analysis algorithms, such as linear regression, Naïve Bayes, support vector machines, and recurrent neural networks. Based on the analysis of the code change explanation request, query generator 204 generates (e.g., in real-time) an instruction comprising terms matching or related (semantically or topically) to terms in the code change explanation request.

In some examples, query generator 204 generates multiple queries that are at least slightly different in scope. For instance, query generator 204 may generate a first query that is intended to elicit a high-level response (e.g., a response that is summary in nature and omits detailed description) and a second query that is intended to elicit a low-level response (e.g., a response that is detailed in nature and includes explanations of concepts, acronyms, and/or obscure terms). Query generator 204 may provide each of the multiple queries as options to the user. Upon receiving a selection of a query from the user, query generator 204 selects the user-selected query. In some examples, query generator 204 records the selection of the user-selected query and uses the recorded selection to inform subsequent determinations of queries to generate and/or provide to the language model 120.

In yet other examples, query generator 204 does not generate queries. For instance, in one embodiment, language model 120 does not require or accept a query from query generator 204. Instead, query generator 204 formats (or provides instructions for formatting) the code change context 230 and/or the portion of software code received from context builder 202 to a format expected by language model 120. For instance, query generator 204 verifies that the code change context 230 and/or portion of software code does not exceed a maximum line limit and verifies that the code change context 230 and/or the portion of software code do not collectively exceed a maximum token limit.

In another instance, query generator 204 creates (or provides instructions for creating) vector representations of the code change context 230 and/or the portion of software code. Additionally, query generator 204 may ensure that the code change context 230 and the portion of software code each adhere to a respective data schema and are provided in a certain sequence to language model 120. In such examples, although language model 120 does not require or accept queries from instruction query 204, language model 120 may require or accept instructions from a different source. For instance, as part of or in response to formatting performed by query generator 204, a separate service that is internal to or external to the generative AI system executing process flow 200 may provide instructions relating to the code change explanation request to language model 120.

In another embodiment, query generator 204 provides information that is not instructions. For instance, instead of generating instructions including a statement or a request intended for language model 120, query generator 204 identifies other information relating to the code change context and/or the portion of software code. As one example, query generator 204 identifies a creation timestamp for the code change context 230, line numbers of interest in the portion of software code, and/or one or more previous incident reports for a software service or application experiencing an issue related to the code change. In another instance, language model 120 receives hard-coded instructions for which users are expected to provide values for one or more parameters in the hard-coded instructions. As one example, query generator 204 may provide, via a user interface, a request for instruction parameters to a user that provided the code change explanation request. Such instruction parameters may include, for example, a knowledge level of the user with particular topics, a desired level of detail for an answer or output, a desired length for an answer or output, or a data source to query.

Language model query API 220 provides the code change context code change context 230 for the portion of software code and the query corresponding to the code change explanation request to language model 120. In some examples, language model query API 220 further provides the portion of software code (e.g., lines of software code from the software code file) to language model 120. In some examples, language model query API 220 also provides one or more previous dialogue entries between the user and language model 120 to language model 120. For instance, during a previous turn of an ongoing conversation between the user and language model 120, the user provided a first request to language model 120 to provide an explanation of a code change of the portion of software code and whether the code change is related to any incidents. In this instance, in response to the first request, language model 120 provided an explanation of the code change to the portion of software code. In the current turn of the ongoing conversation, the user provides a second request (i.e., "How many customers were affected in the incident(s)?") to language model 120. Language model query API 220 obtains the dialogue entries from the previous turn of the ongoing conversation (e.g., the request from the user and the response from language model 120). For instance, language model query API 220 may retrieve the dialogue entries from a dialogue history log maintained by language model 120 or a user request log maintained by the generative AI system 104. In examples, providing the previous dialogue entries to language model 120 enables language model 120 to process current requests within the context of the previous dialogue entries to simulate an ongoing conversation.

Language model 120 processes the input received from language model query API 220 and generates output that is responsive to the code change explanation request. For example, language model 120 generates a natural language explanation of the code change to the portion of software code based on an analysis by language model 120 of the code change context 230 for the portion of software code and the lines of software code from the software code file. Language model 120 then provides the output to language model query API 220. In some examples, explanation generator 206 processes the output of language model 120 and generates a code change explanation response, which is provided to user device 102. The code change explanation response includes a natural language explanation of the code change indicated in the code change explanation request. In some implementations, explanation generator 206 determines one or more suggested follow-up request options, which are included in the code change explanation response and presented to the user. The one or more suggested follow-up request options may be generated by language model 120. In further implementations, explanation generator 206 includes, in the code change explanation response, one or more links and/or references to the information sources 210 from which code change context was obtained. Alternatively, language model 120 may provide the output including a code change explanation directly to user device 102. In either scenario, providing the code change explanation to user device 102 terminates process flow 200.

Figure 3:
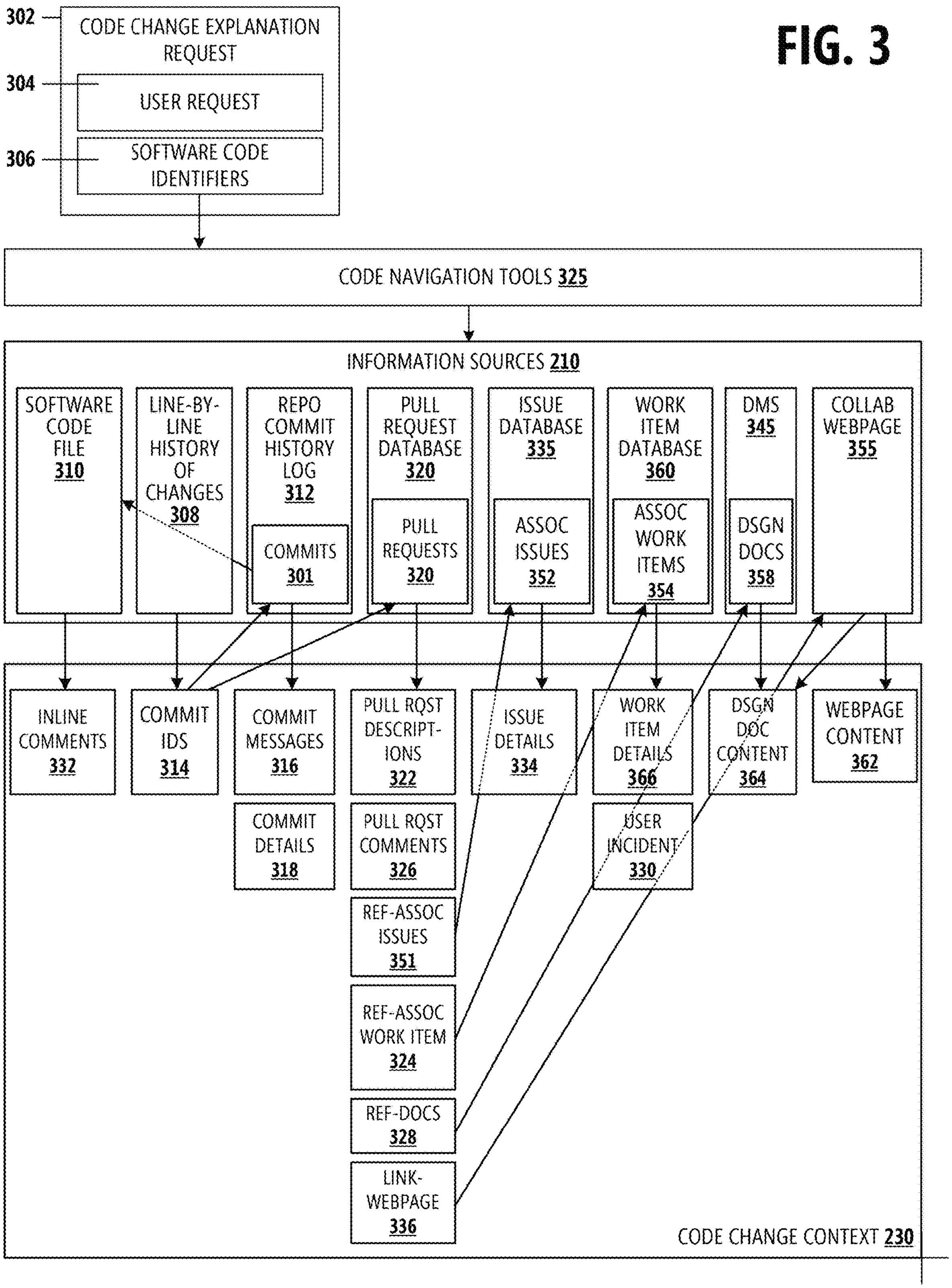
FIG. 3 illustrates example code change context collected for generating an explanation of code change history using a generative AI system.

FIG. 3 is an illustration of example code change context 230 relevant to a code change to software code of a software code file 310 and collected from various information sources 210. A code change explanation request 302 is received by code change explanation API 214 of generative AI system 104. In examples, code change explanation request 302 includes a user request 304 selected or provided by a user, where the user request 304 inquires about a change of interest (e.g., a code change made to a portion of the software code of the software code file 310).

In some examples, generative AI system 104 uses the software code identifiers 306 included in the code change explanation request 302 and/or other collected information to interact with one or more code navigation tools 325, navigate and search various information sources 210, and access and obtain code change context 230 relevant to the software code portion. One example information source 210 is the software code file 310 from which inline comments 332 are collected. In an implementation, a software code file viewer interface is used to access the software code file 310. In some examples, the software code file 310 is a current version of the software code file. In other examples, the software code file 310 is a previous version of the software code file. The previous version of the software code file 310 may be identified via another code navigation tool 325 (e.g., repository commit history log viewer).

Another example information source 210 is a line-to-line history of changes 308 of the software code file 310. For instance, the line-to-line history of changes 308 includes information about a change made to a line of software code, such as a unique commit identifier 314 of a commit 301 that introduced the change, and other metadata (e.g., person who made the change, services or application used to make the changes, timestamps). In examples, generative AI system 104 may obtain the commit identifier 314 to collect information about the commit 301 and other related commits 301. For instance, generative AI system 104 may execute a search using repository commit history log 312 based on the commit identifier 314 to collect a natural language commit message 316 describing the change and other commit details 318. The repository commit history log 312 provides an overview of the software code repository's commit history. For instance, a chronological list is provided of commits 301 made to the entire software code repository 110 or to a specific branch including information about each commit 301, such as the commit identifier 314, commit messages 316, commit details 318, and/or other information about the changes made in each commit 301.

In examples, generative AI system 104 further uses the identified commit identifier 314 to identify pull requests 320 associated with the commits 301. In examples, the pull requests 320 are stored and managed in a pull request database 315. Additionally, from each pull request 320, a search is performed for various code change context 230, which when identified, is extracted by generative AI system 104. Some examples of code change context 230 collected from a pull request 320 include a pull request description 322, pull request comments 326, references 351 to associated issues 352, references 324 to associated work items 354, references 328 to associated design documents 358, links 336 to related collaborative webpages 355 (e.g., wikis), etc.

In some implementations, associated work items 354 are used to track work being done in the pull request 320. In some examples, an associated work item 354 is linked to a user incident 330. For instance, when a user incident 330 occurs, an associated work item 354 may be created to track work needed to resolve the incident. The work item 354 can then be linked to the user incident 330 for tracking and communication purposes. In further examples, an associated issue 352 may be associated with a pull request 320, where an associated issue 352 is an data record that is created in an issue database 335 that includes details 334 of the issue 352. In some examples, a single pull request 320 may be associated with multiple associated work items 354 and associated issues 352. Further, a user incident 330 may be tracked across multiple associated issues 352 and pull requests 320. In examples, generative AI system 104 collects issue details 334 via the issue explorer and work item details 366 stored and/or managed in a work item database 360 via the work item explorer. In some examples, generative AI system 104 further extracts a description about the user incident 330.

In further examples, generative AI system 104 uses a document management and storage system search interface to access design documents 358 stored by a document management and storage system 345. In examples, generative AI system 104 further extracts content 364 of related design documents 358 and/or other relevant code change context 230 in the document management and storage system 345.

In further examples, generative AI system 104 uses a collaborative webpage browser interface to access webpage content 362 included in a collaborative webpage 355 associated with the software code project. In some examples, the webpage content 362 includes references 328 to related design documents 358. In examples, generative AI system 104 further extracts webpage content 362 content and/or design document content 364 of linked design documents 358. In some examples, other relevant code change context 230 in the collaborative webpage content 362 may include information about past releases, including new features, bug fixes, and/or changes in each version of the software code project. In further examples, other code navigation tools 325, information sources 210 of relevant code change context 230, and/or other code change context 230 are contemplated.

Figure 4A:
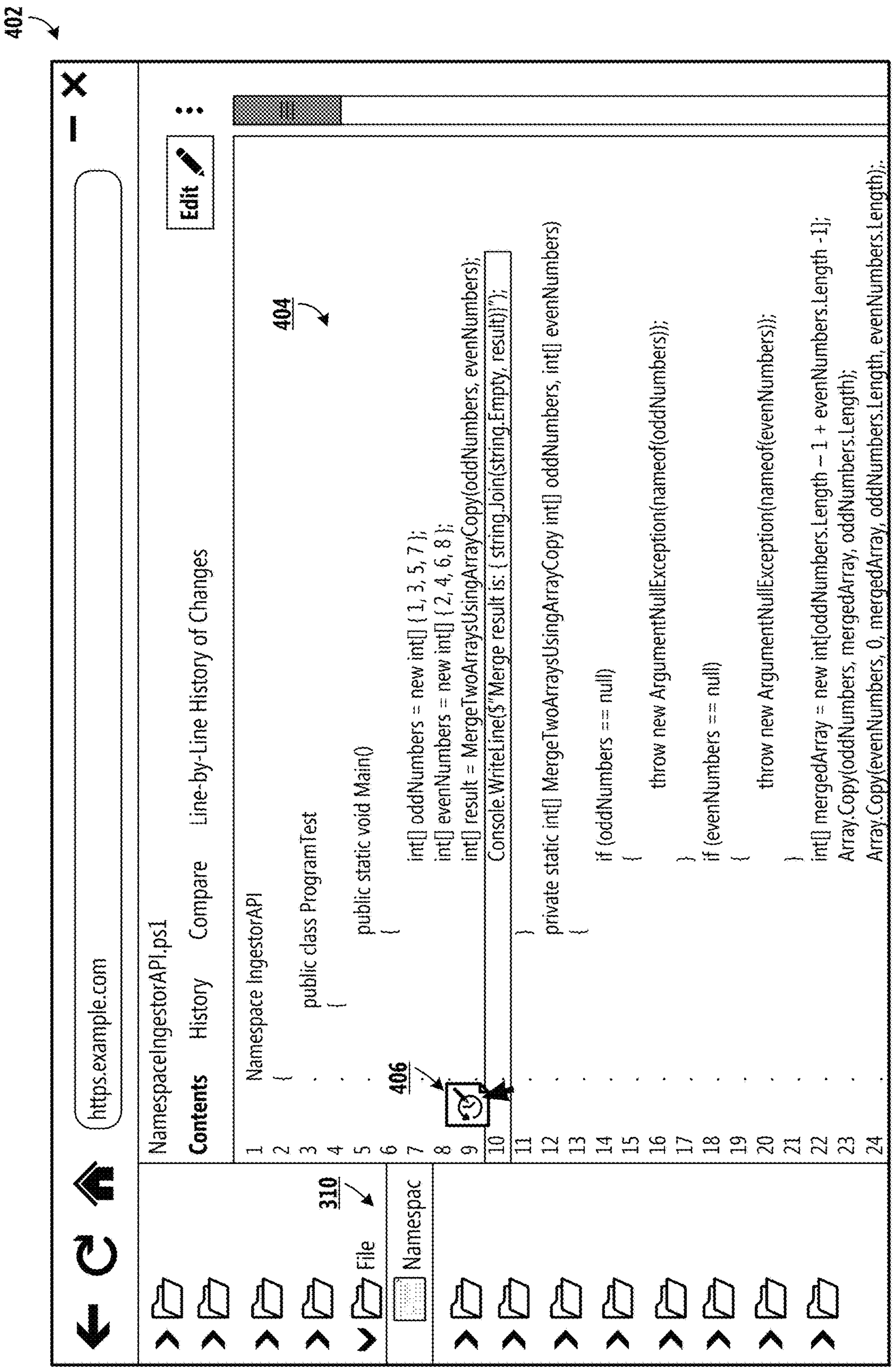
FIGS. 4A-4E illustrate example user interfaces associated with uses of the generative AI system discussed herein.

FIGS. 4A-4E are illustrations of user interfaces associated with uses of generative AI system 104. FIG. 4A illustrates a user interface 402 of a client application 108 that is used to review software code 404. User interface 402 displays software code 404, where software code 404 represents lines of software code of a software code file 310. User interface 402 includes "Explain Code Change" user interface element 406. While reviewing software code 404, the user may select "Explain Code Change" user interface element 406. In some implementations the "Explain Code Change" user interface element 406 is displayed in association with a portion of software code 404 (e.g., a line or a plurality of lines, a method, or a function). In other implementations, the Explain Code Change" user interface element 406 is displayed in association with a selected portion of software code 404. In examples, selection of "Explain Code Change" user interface element 406 invokes code change explanation API 214. For instance, a user request 304 (e.g., the user selection) is received as part of a code change explanation request 302 by generative AI system 104, which uses language model 120 to generate a response. In some implementations, the code change explanation request 302 further includes one or more software code identifiers 306 corresponding to the software code file 310, line number, method, or function.

Figure 4B:
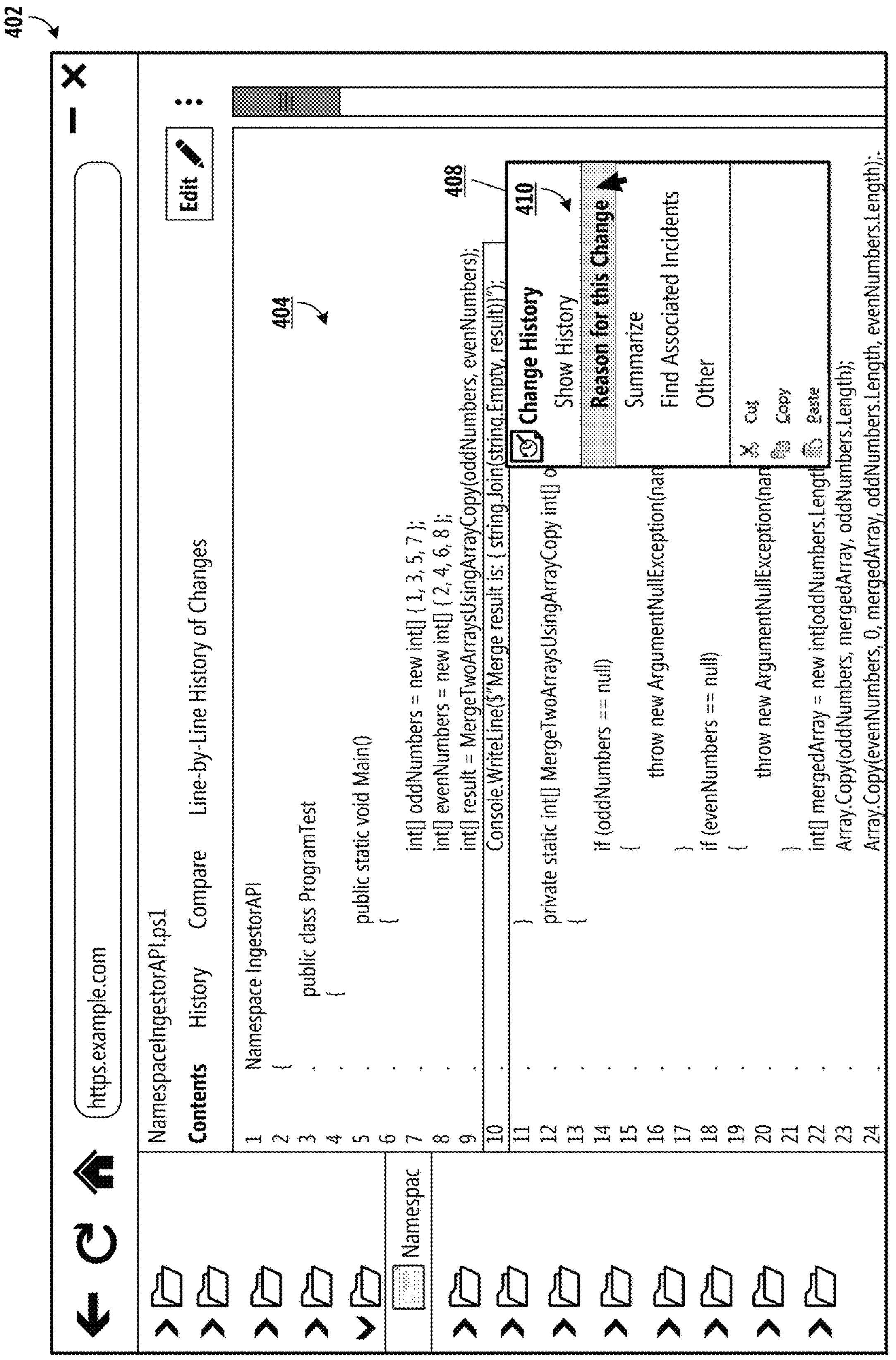

FIG. 4B illustrates user interface 402 of FIG. 4A, where user interface 402 displays a context menu 408 including a plurality of preconfigured explanation request options 410 from which the user may select. Some example preconfigured explanation request options corresponding to various requests about a change of interest (e.g., a change made to a selected or otherwise indicated portion of software code 404 in user interface 402). In examples, selection of a preconfigured explanation request option 410 invokes code change explanation API 114. For instance, a user request 304 (e.g., the user selection) is received as part of a code change explanation request 302 by generative AI system 104, which uses language model 120 to generate a response. In some implementations, the code change explanation request 302 further includes one or more software code identifiers 306 corresponding to the software code file 310, line number, method, or function.

Figure 4C:
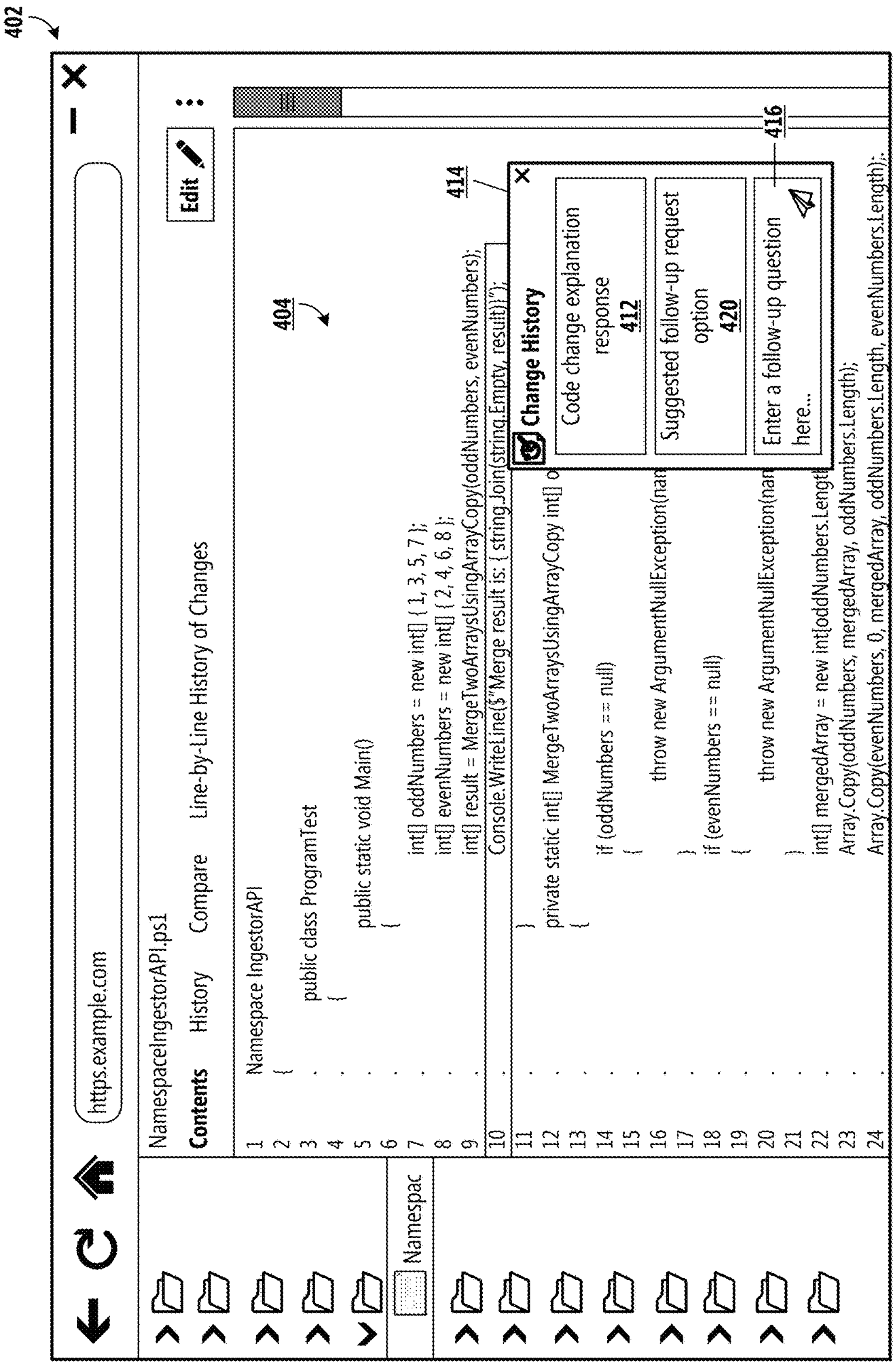

FIG. 4C illustrates user interface 402 of FIGS. 4A and 4B, where user interface 402 displays a code change explanation response 412 based on an output generated by language model 120. The code change explanation response 412 includes a natural language explanation of code change of interest. In some examples, code change explanation response 412 is displayed in a user interface element 414. In further examples, the user interface element 414 includes an option 416 for receiving a follow-up user request 304 from the user. In yet further examples, the user interface element 414 includes one or more suggested follow-up request options 420 generated by generative AI system 104. The one or more suggested follow-up request options 420 offer relevant options for the user to choose from as a next user request 304. When a suggested follow-up request option 420 is selected, a subsequent code change explanation request 302 corresponding to the selected suggested follow-up request option 420 is communicated to and received by generative AI system 104.

Figure 4D:
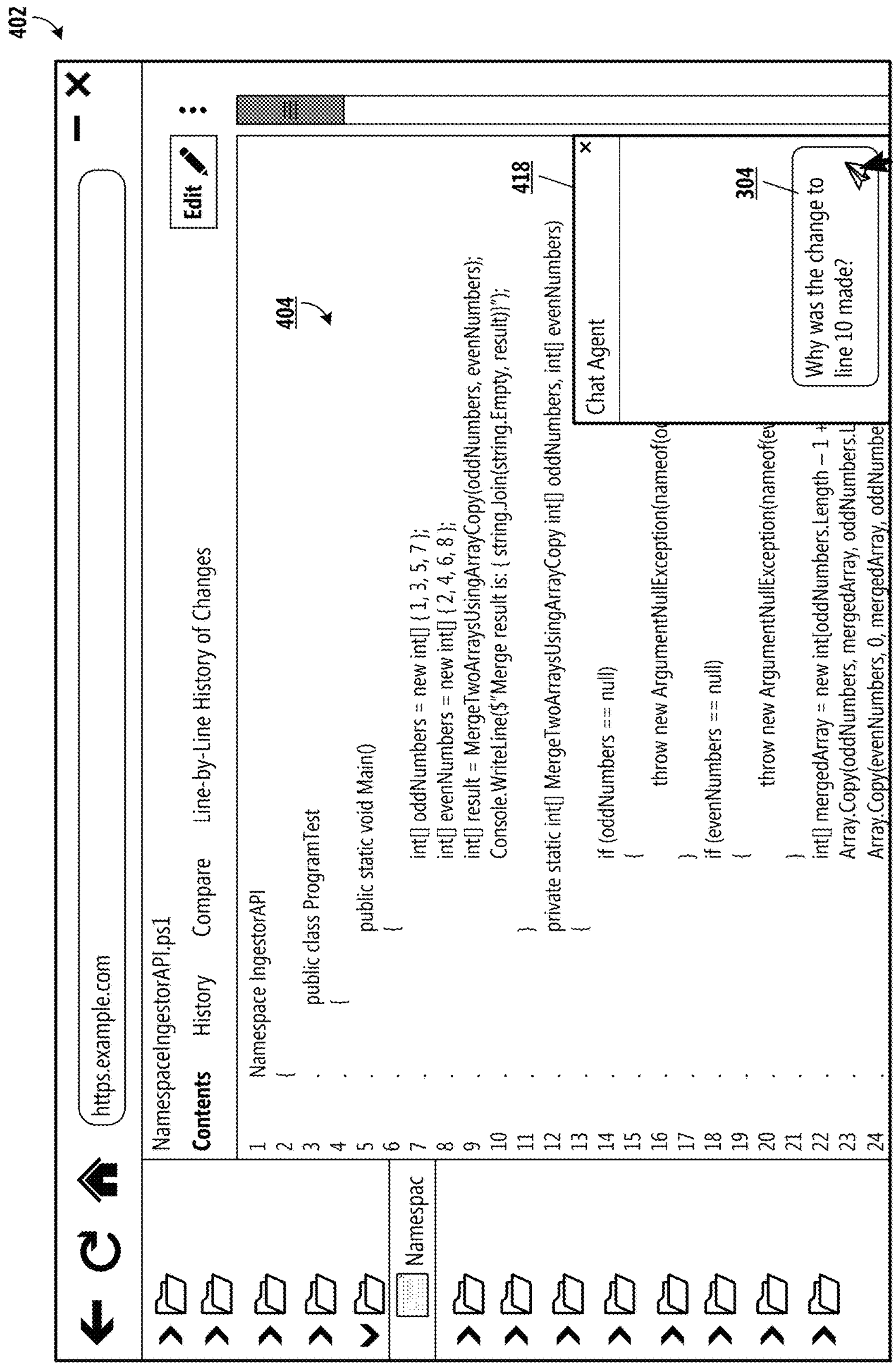

FIG. 4D illustrates user interface 402 of FIGS. 4A-4C, where user interface 402 includes a chat agent user interface 418. In some examples, chat agent user interface 418 is provided by a chat agent 118 of client application 108. In other examples, chat agent user interface 418 is provided by a chat agent 118 of software code repository and version control service 112. While reviewing software code 404, the user may enter a user request 304 (e.g., chat input) into chat agent user interface 418, such as "Why was the change to line 10 made?" In examples, sending the user request 304 invokes code change explanation API 214. For instance, user request 304 (e.g., the chat dialogue input) is received as part of a code change explanation request 302 by generative AI system 104, which uses language model 120 to generate a response. In some implementations, the code change explanation request 302 further includes one or more software code identifiers 306 corresponding to the software code file 310, line number, method, or function.

Figure 4E:
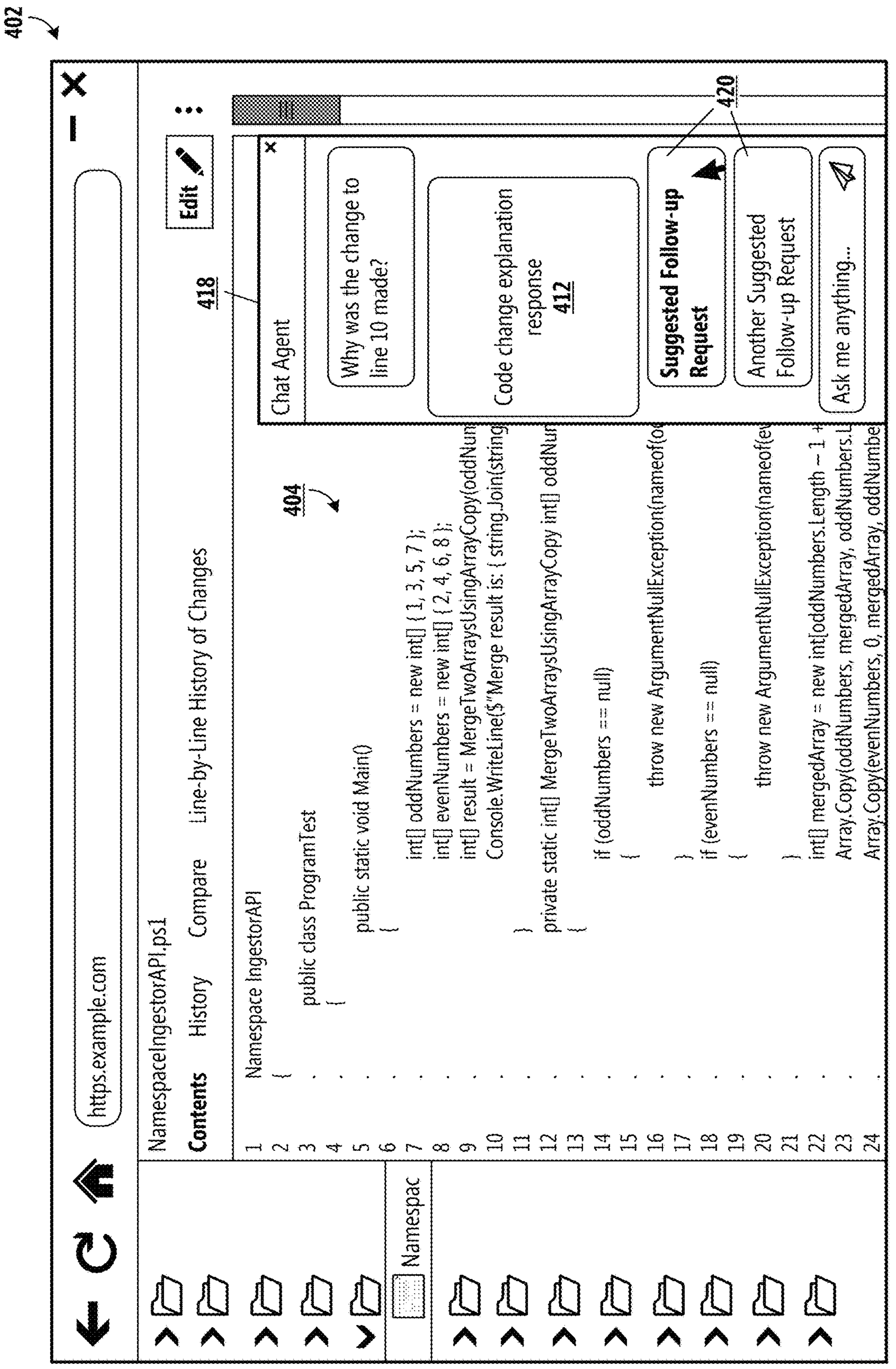

FIG. 4E illustrates user interface 402 of FIGS. 4A-4D, where chat agent user interface 418 displays a code change explanation response 412 including a natural language explanation of the code change based on output generated by language model 120 to user request 304 (e.g., the chat dialogue input). In some implementations, code change explanation response 412 includes one or more suggested follow-up requests 420 determined by generative AI system 104. For instance, selection of a suggested follow-up request 420 invokes generative AI system 104 to generate a follow-up request based on the selected follow-up request 420.

Figure 5:
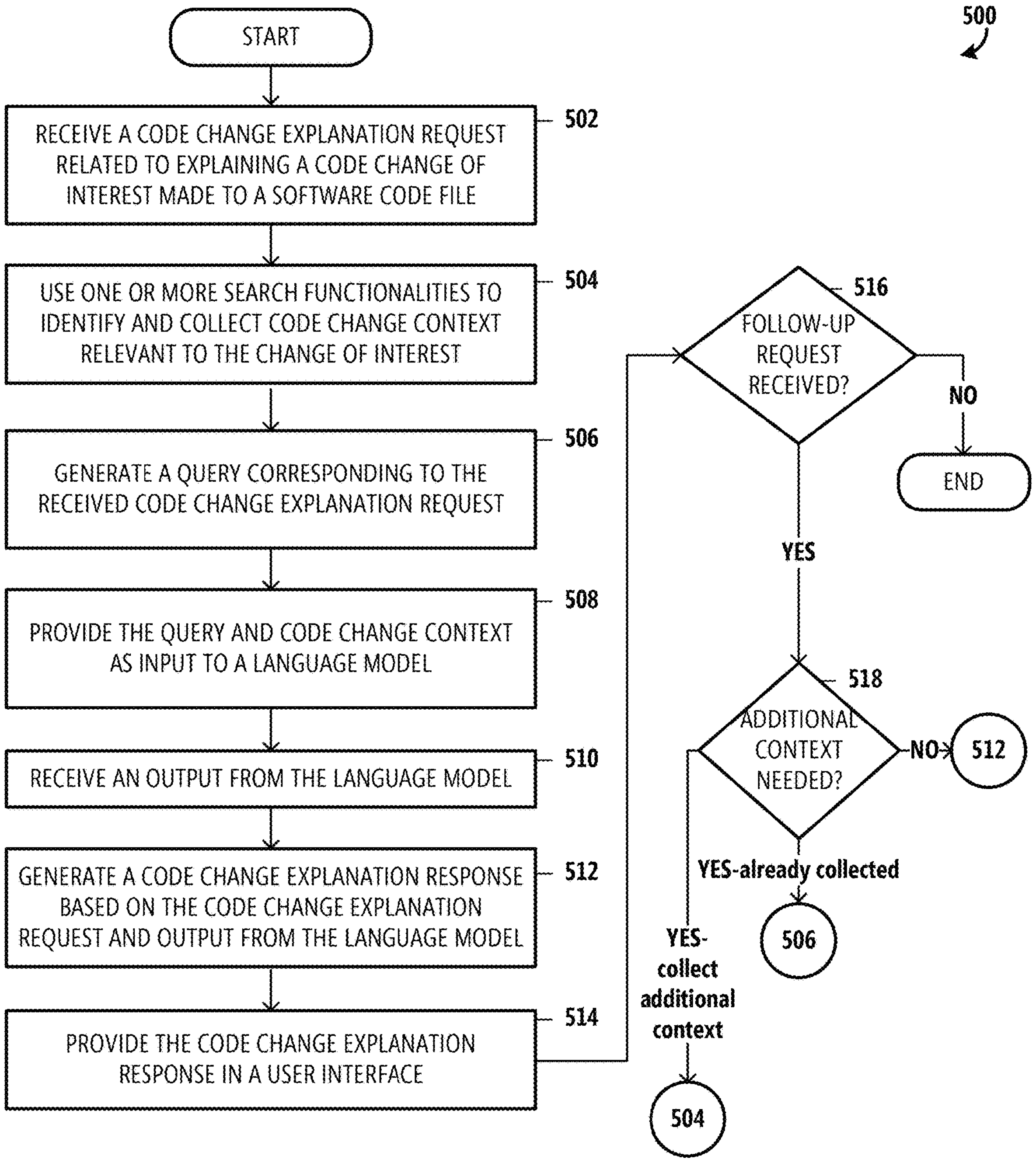
FIG. 5 illustrates an example method for automatically generating an explanation of code change history using a generative AI system.

FIG. 5 illustrates a method 500 for automatically generating an explanation of code change history using a generative AI system. Method 500 begins at operation 502, where a generative AI system, such as generative AI system 104, receives a code change explanation request 302. In examples, the code change explanation request 302 is triggered by a user request 304 received from a user, where the user request 304 inquires about a code change of interest made to a portion of software code 404 of a software code file 310. In examples, the user may interact with the software code file 310 using client application 108 and/or software code repository and version control service 112. In some implementations, the user request 304 corresponds to a user selection of a user interface element 406 or a preconfigured explanation request option 410. In other implementations, the user request 304 corresponds to a chat input via a chat agent user interface 418. In yet other implementations, user request 304 corresponds to another type of user input related to inquiring about a code change to the portion of software code 404. The portion of software code 404 includes one or more lines of software code, a function, method, or other portion of the software code. In some examples, the portion of software code 404 is selected by the user. In other examples, the portion of software code 404 is indicated by the user request 304. In some implementations, the code change explanation request 302 includes one or more identifiers 306 corresponding to the software code file 310 and one or more lines of the software code, method, function or other portion of the software code 404 selected or indicated by the user in association with the user request 304.

At operation 504, a search is executed using one or more code navigation tools 325 provided by software code repository and version control service 112 and/or an IDE application used by the user for viewing or editing software code 404. In some examples, generative AI system 104 uses a software code file viewer interface to access the associated software code file 310 (e.g., a current version and/or previous versions) to collect inline comments 332 included in the software code file 310. In further examples, generative AI system 104 uses accesses a line-by-line history of changes 308 to identify one or more commit identifiers 314 associated with the change of interest. In further examples, generative AI system 104 uses the commit identifier(s) 314 to execute a search of repository commit history log 312 to access associated commits 301 and to collect commit messages 316 and commit details 318 included in the commits 301. In yet further examples, generative AI system 104 uses commit identifier(s) 314 and/or other collected commit details 318 to identify one or more pull requests 320 associated with the change of interest. In still yet further examples, generative AI system 104 searches associated pull requests 320 to collect pull request descriptions 322 and pull request comments 326. The generative AI system 104 may further identify and collect information about associated work items 354 and associated user incidents 330. In further examples, generative AI system 104 identifies associated issues 352 and collects associated issue details 334. In yet further examples, generative AI system 104 identifies associated design documents 358, accesses the identified design documents 358, and collects design document content 364. In still yet further examples, generative AI system 104 identifies a link 336 to an associated collaborative webpage 355, navigates to the collaborative webpage 355, and collects webpage content 362.

At operation 506, a query (e.g., a prompt, instructions, directions, or other information) is generated, where the query is intended to solicit an explanation of the history of a change or changes made to the portion of software code 404 based on the code change explanation request 302 and collected code change context 230. In an example implementation, the query is an AI prompt that guides language model 120 to generate a response to the code change explanation request 302, which is provided with the extracted code change context 230, to language model 120 at operation 508.

At operation 510, an output is received from language model 120 in response to the input. The output may include a summary, an answer to a question, or other type of requested explanation of the code change(s). In some implementations, the output from language model 120 includes a code explanation response 412 that is provided to client application 108 and presented to the user at operation 514. In other implementations, at operation 512, a code change explanation response 412 is generated by generative AI system 104 based on the language model output, which is provided to client application 108 and presented to the user at operation 514. In some implementations, the code change explanation response 412 includes one or more selectable suggested follow-up requests 420 generated and provided by generative AI system 104. In some examples, generative AI system 104 queries language model 120 to generate the one or more selectable follow-up requests 420.

At decision operation 516, a determination is made as to whether a follow-up request is received. For instance, the follow-up user request may correspond to a user selection of a suggested follow-up request 420, input of another user request, selection of another preconfigured explanation request option 410, etc. When a follow-up user request is determined to be received, method 500 proceeds to decision operation 518, where a determination is made as to whether additional context is needed to respond to the follow-up user request. In some examples, generative AI system 104 queries language model 120 to determine whether additional code change context 230 is needed to generate a response. In some examples, code change context 230 and output from language model 120 includes sufficient context to respond to the follow-up user request (e.g., generate an accurate response). Thus, a determination is made that additional context is not needed and method 500 returns to operation 512 to generate a second code change explanation response 412. In some examples, when a determination is made at decision operation 518 that additional code change context 230 (e.g., a second turn with language model 120) is needed to respond to the follow-up user request (e.g., to generate a more accurate response than without additional context), method 500 returns to operation 506 to generate a second query for language model 120 to solicit a response to the follow-up user request to present to the user. In some examples, the first query may include a subset of the collected code change context 230 and the second query may include another subset of the collected code change context 230. In other examples, when a determination is made at decision operation 518 that additional code change context 230 is needed to respond to the follow-up user request, method 500 returns to operation 504 to obtain additional code change context 230 from one or more information sources 210. Method 500 ends when a follow-up request is not received.

Figure 6:
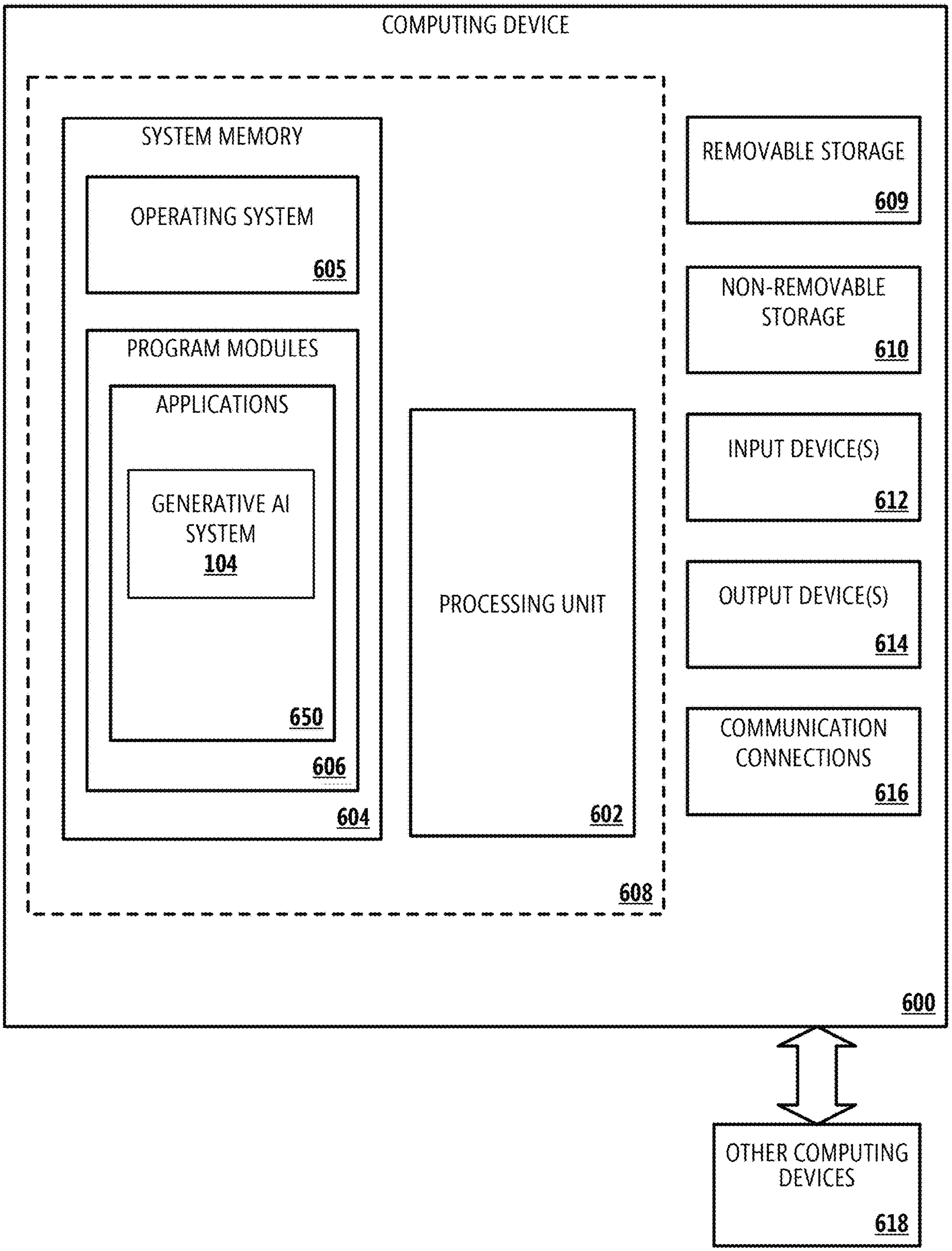
FIG. 6 is a block diagram illustrating example physical components of a computing device for practicing aspects of the disclosure.

FIG. 6 is a block diagram illustrating physical components (e.g., hardware) of a computing device 600 with which aspects of the disclosure may be practiced. The computing device components described below may be suitable for the computing devices and systems described above. In a basic configuration, the computing device 600 includes at least one processing system 602 and a system memory 604. Depending on the configuration and type of computing device, the system memory 604 comprises volatile storage (e.g., random access memory (RAM)), non-volatile storage (e.g., read-only memory (ROM)), flash memory, or any combination of such memories.

The system memory 604 includes an operating system 605 and one or more program modules 606 suitable for running software application 620, such as one or more components supported by the systems described herein. The operating system 605, for example, is suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, or optical disks. Such additional storage is illustrated in FIG. 6 by a removable storage device 607 and a non-removable storage device 610.

As stated above, a number of program modules and data files may be stored in the system memory 604. While executing on the processing system(s) 602, the program modules 606 (e.g., generative AI system 104) may perform processes including the aspects described herein. Other program modules that may be used in accordance with aspects of the present disclosure include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing systems/units, graphics units, communications units, system virtualization units and various application functionality all of which are integrated (or "burned") onto the chip substrate as a single integrated circuit. When operating via an SOC, the functionality described herein with respect to the capability of a client to switch protocols, may be operated via application-specific logic integrated with other components of the computing device 600 on the single integrated circuit (chip). Embodiments of the disclosure may also be practiced using other technologies capable of performing logical operations such as, for example, AND, OR, and NOT, including mechanical, optical, fluidic, and quantum technologies. In addition, embodiments of the disclosure may be practiced within a general-purpose computer or in any other circuits or systems.

The computing device 600 also has one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 607, and the non-removable storage device 610 are all computer storage media examples (e.g., memory storage). Computer storage media includes RAM, ROM, electrically erasable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

As will be understood from the present disclosure, one example of the technology discussed herein relates to a system comprising: a processing system; and memory comprising computer executable instructions that, when executed, perform operations comprising: receiving an indication of a first code change explanation request in relation to a code change to a portion of a software code file; executing a first search for code change context relevant to the first code change explanation request; collecting, from one or more information sources, a first set of the code change context relevant to the first code change explanation request; providing as a first input to a language model: at least a first subset of the first set of the code change context; and a query instructing the language model to generate a response to the first code change explanation request based on the first subset of the first set of the code change context; receiving a first natural language output from the language model responsive to the first input; generating a first code change explanation response based on the first natural language output received from the language model; and providing the first code change explanation response to a requestor of the first code change explanation request.

Another example of the technology discussed herein relates to a method, comprising: receiving an indication of a first code change explanation request in relation to a code change to a portion of a software code file; executing a first search for code change context relevant to the first code change explanation request; collecting, from one or more information sources, a first set of the code change context relevant to the first code change explanation request; providing, as a first input to a language model: at least a first subset of the first set of the code change context; and a query instructing the language model to generate a response to the first code change explanation request based on the first subset of the first set of the code change context; receiving a first natural language output from the language model responsive to the first input; generating a first code change explanation response based on the first natural language output received from the language model; and providing the first code change explanation response to a requestor of the first code change explanation request.

Another example of the technology discussed herein relates to a device, comprising: a processing system; and memory comprising computer executable instructions that, when executed, perform operations, comprising: receiving an indication of a first code change explanation request in relation to a code change to a portion of a software code file; executing a first search for code change context relevant to the first code change explanation request; collecting, from one or more information sources, a first set of the code change context relevant to the first code change explanation request; providing, as a first input to a language model: at least a first subset of the first set of the code change context; and a query instructing the language model to generate a response to the first code change explanation request based on the first subset of the first set of the code change context; receiving a first natural language output from the language model responsive to the first input; generating a first code change explanation response based on the first natural language output received from the language model; and providing the first code change explanation response to a requestor of the first code change explanation request.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, it is envisioned that variations, modifications, and alternate aspects fall within the spirit of the broader aspects of the general inventive concept embodied in this application do not depart from the broader scope of the claimed disclosure.

What is claimed is:

1. A system comprising:

a processing system; and memory comprising computer executable instructions that, when executed, perform operations comprising:

receiving an indication of a first code change explanation request in relation to a code change to a portion of a software code file;

executing a first search for code change context relevant to the first code change explanation request;

collecting, from one or more information sources, a first set of the code change context relevant to the first code change explanation request;

providing as a first input to a language model:

at least a first subset of the first set of the code change context; and a query instructing the language model to generate a response to the first code change explanation request based on the first subset of the first set of the code change context;

receiving a first natural language output from the language model responsive to the first input;

generating a first code change explanation response based on the first natural language output received from the language model, wherein the first code change explanation response comprises a link to at least one of the one or more information sources; and providing the first code change explanation response to a requestor of the first code change explanation request.

2. The system of claim 1, the operations further comprising:

receiving an indication of a second code change explanation request in relation to the code change;

providing, as a second input to the language model, a query instructing the language model to generate a response to the second code change explanation request;

receiving a second natural language output from the language model responsive to the second input;

generating a second code change explanation response based on the second natural language output received from the language model; and providing the second code change explanation response to the requestor.

3. The system of claim 2, wherein:

the first set of the code change context includes the first subset and a second subset, where the second subset includes details about the first subset; and prior to providing the second input to the language model, the operations further comprise including, in the second input to the language model, the second subset of the first set of the code change context.

4. The system of claim 2, wherein prior to providing the second input to the language model, the operations further comprise:

providing, to the language model:

the first subset of the first set of the code change context;

the second code change explanation request; and a query requesting a determination from the language model as to whether additional context would increase accuracy of a response to the second code change explanation request;

receiving, from the language model, a response indicating a determination that additional context would increase the accuracy of the response to the second code change explanation request;

executing a second search for code change context relevant to the second code change explanation request;

collecting, from one or more information sources, a second set of the code change context relevant to the second code change explanation request; and including, in the second input to the language model, the second set of the code change context.

5. The system of claim 1, wherein the one or more information sources include at least one of:

the software code file;

a commit history log;

a commit included in the commit history log associated with the code change to the software code file;

a pull request database;

a pull request associated with a commit included in the pull request database;

an issue database;

an issue associated with a pull request included in the issue database;

a work item database;

a work item associated with a pull request included in the work item database;

a document management system related to the software code file;

a document stored in the document management system; or a collaborative webpage related to the software code file.

6. The system of claim 5, wherein the code change context comprises natural language text of one or more of:

an inline comment included in a current version of the software code file;

an inline comment included in a previous version of the software code file;

a commit identifier of the commit;

a commit message included in the commit;

a commit detail included in the commit;

a pull request description included in the pull request;

a pull request comment included in the pull request;

a detail of the work item;

a detail of a user incident associated with the work item;

a detail of the issue;

content of a design document included in the document management system; or content of the collaborative webpage.

7. The system of claim 5, wherein executing the first search comprises using at least one code navigation tool to access the code change context, the at least one code navigation tool including:

a software code file viewer interface;

a repository commit history log viewer;

a line history viewer;

a pull request interface;

an issue explorer;

a work item explorer;

a document management system search interface; or a collaborative webpage browser interface.

8. The system of claim 1, wherein the language model is a generative artificial intelligence (AI) model.

9. The system of claim 1, wherein receiving the indication of the first code change explanation request comprises at least one of:

receiving an indication of a selection of a user interface element displayed in a user interface with the portion of the software code file;

receiving an indication of a selection of a preconfigured explanation request option displayed in a context menu; or receiving an indication of an input dialogue received from the requestor to a chat agent via a chat agent interface.

10. A method, comprising:

receiving an indication of a first code change explanation request in relation to a code change to a portion of a software code file, wherein receiving the indication comprises receiving one or more of:

a user selection of a user interface element displayed in a user interface with the portion of the software code file;

a user selection of a preconfigured explanation request option; or an input dialogue received in a chat conversation between a requestor and a chat agent via a chat agent interface;

executing a first search for code change context relevant to the first code change explanation request;

collecting, from one or more information sources, a first set of the code change context relevant to the first code change explanation request;

providing, as a first input to a language model:

at least a first subset of the first set of the code change context; and a query instructing the language model to generate a response to the first code change explanation request based on the first subset of the first set of the code change context;

receiving a first natural language output from the language model responsive to the first input;

generating a first code change explanation response based on the first natural language output received from the language model; and providing the first code change explanation response to the requestor of the first code change explanation request.

11. The method of claim 10, further comprising:

receiving an indication of a second code change explanation request in relation to the code change;

providing, as a second input to the language model, a query instructing the language model to generate a response to the second code change explanation request;

receiving a second natural language output from the language model responsive to the second input;

generating a second code change explanation response based on the second natural language output received from the language model; and providing the second code change explanation response to the requestor.

12. The method of claim 10, wherein the one or more information sources include at least one of:

the software code file;

a commit history log;

a commit included in the commit history log associated with the code change to the software code file;

a pull request database;

a pull request associated with a commit included in the pull request database;

an issue database;

an issue associated with a pull request included in the issue database;

a work item database;

a work item associated with a pull request included in the work item database;

a document management system related to the software code file;

a document stored in the document management system; or a collaborative webpage related to the software code file.

13. The method of claim 12, wherein the code change context comprises natural language text of one or more of:

an inline comment included in a current version of the software code file;

an inline comment included in a previous version of the software code file;

a commit identifier of the commit;

a commit message included in the commit;

a commit detail included in the commit;

a pull request description included in the pull request;

a pull request comment included in the pull request;

a detail of the work item;

a detail of a user incident associated with the work item;

a detail of the issue;

content of a design document included in the document management system; or content of the collaborative webpage.

14. A device, comprising:

a processing system; and memory comprising computer executable instructions that, when executed, perform operations, comprising:

receiving an indication of a first code change explanation request in relation to a code change to a portion of a software code file, wherein receiving the indication comprises receiving one or more of:

a user selection of a user interface element displayed in a user interface with the portion of the software code file;

a user selection of a preconfigured explanation request option; or an input dialogue received in a chat conversation between a requestor and a chat agent via a chat agent interface;

executing a first search for code change context relevant to the first code change explanation request;

collecting, from one or more information sources, a first set of the code change context relevant to the first code change explanation request;

providing, as a first input to a language model:

at least a first subset of the first set of the code change context; and a query instructing the language model to generate a response to the first code change explanation request based on the first subset of the first set of the code change context;

receiving a first natural language output from the language model responsive to the first input;

generating a first code change explanation response based on the first natural language output received from the language model; and providing the first code change explanation response to the requestor of the first code change explanation request.

15. The device of claim 14, the operations further comprising:

receiving an indication of a second code change explanation request in relation to the code change;

providing, as a second input to the language model, a query instructing the language model to generate a response to the second code change explanation request;

receiving a second natural language output from the language model responsive to the second input;

generating a second code change explanation response based on the second natural language output received from the language model; and providing the second code change explanation response to the requestor.

16. The device of claim 15, wherein:

the first set of the code change context includes the first subset and a second subset, where the second subset includes details about the first subset; and prior to providing the second input to the language model, the operations further comprise including, in the second input to the language model, the second subset of the first set of the code change context.

17. The device of claim 14, the operations further comprising:

receiving feedback from the requestor about the first code change explanation response; providing the feedback to the language model;

receiving a second natural language output from the language model responsive to the feedback;

generating a second code change explanation response based on the second natural language output received from the language model; and providing the second code change explanation response to the requestor.

18. The device of claim 14, wherein:

executing the first search comprises collecting the code change context from one or more information sources, the one or more information sources including:

the software code file;

a commit history log;

a commit included in the commit history log associated with the code change to the software code file;

a pull request database;

a pull request associated with a commit included in the pull request database;

an issue database;

an issue associated with a pull request included in the issue database;

a work item database;

a work item associated with a pull request included in the work item database;

a document management system related to the software code file;

a document stored in the document management system; or a collaborative webpage related to the software code file.

19. The device of claim 18, wherein the code change context comprises natural language text of one or more of:

an inline comment included in a current version of the software code file;

an inline comment included in a previous version of the software code file;

a commit identifier of the commit;

a commit message included in the commit;

a commit detail included in the commit;

a pull request description included in the pull request;

a pull request comment included in the pull request;

a detail of the work item;

a detail of a user incident associated with the work item;

a detail of the issue;

content of a design document included in the document management system; or content of the collaborative webpage.

20. The device of claim 14, wherein the first code change explanation response comprises a link to at least one of the one or more information sources.

* * * * *